United States Patent [19]
Weerackody et al.

[11] Patent Number: 6,157,612
[45] Date of Patent: *Dec. 5, 2000

[54] FAST FADING PACKET DIVERSITY TRANSMISSION METHOD AND SYSTEM

[75] Inventors: Vijitha Weerackody, Watchung, N.J.; William Glenn Zeng, Pasadena, Calif.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/415,893

[22] Filed: Apr. 3, 1995

[51] Int. Cl.[7] ........................................ H04J 15/00
[52] U.S. Cl. ............................................. 370/215
[58] Field of Search ................... 370/94.1, 94.2, 370/94.3, 95.1, 95.2, 95.3, 60, 60.1, 85.13, 389, 535, 527, 204, 205, 206, 208, 212, 213, 215, 347, 341, 350, 349, 337, 334, 338, 441; 375/347, 260, 283, 295, 267, 268, 241, 242, 243, 238, 261; 455/52.1, 33.3, 38.1, 10, 17, 23; 348/410, 384, 409, 716, 718; 714/746, 752

[56] References Cited

U.S. PATENT DOCUMENTS

| | | | |
|---|---|---|---|
| 5,119,375 | 6/1992 | Paneth et al. | 370/521 |
| 5,305,353 | 4/1994 | Weerackody | 375/205 |
| 5,453,790 | 9/1995 | Vermeulen et al. | 348/410 |
| 5,457,712 | 10/1995 | Weerackody | 375/295 |
| 5,657,325 | 8/1997 | Lou et al. | 370/334 |

OTHER PUBLICATIONS

EP 96 30 2074, European Search Report dated Mar. 8, 2000.

EP 0 572 171 A1, European Patent Application dated Dec. 1, 1993.

EP 0 490 552 A2, European Patent Application dated Jun. 17, 1992.

EP 0 528 642 A2, European Patent Application dated Feb. 24, 1993.

*Primary Examiner*—Dang Ton

[57] ABSTRACT

The present invention is a fast fading packet diversity transmission method and system for reducing the effects of multipath fading on slow fading channels. One embodiment of the present invention includes a modulator for modulating information packets and a plurality of M multipliers for transmitting the modulated information packets from M antennas with up to M sets of M fixed phase offsets. Another embodiment of the present invention transmits a first group of information packets from M antennas with up to M sets of M fixed phase offsets and a second group of information packets with M slow time varying phase offsets.

17 Claims, 24 Drawing Sheets

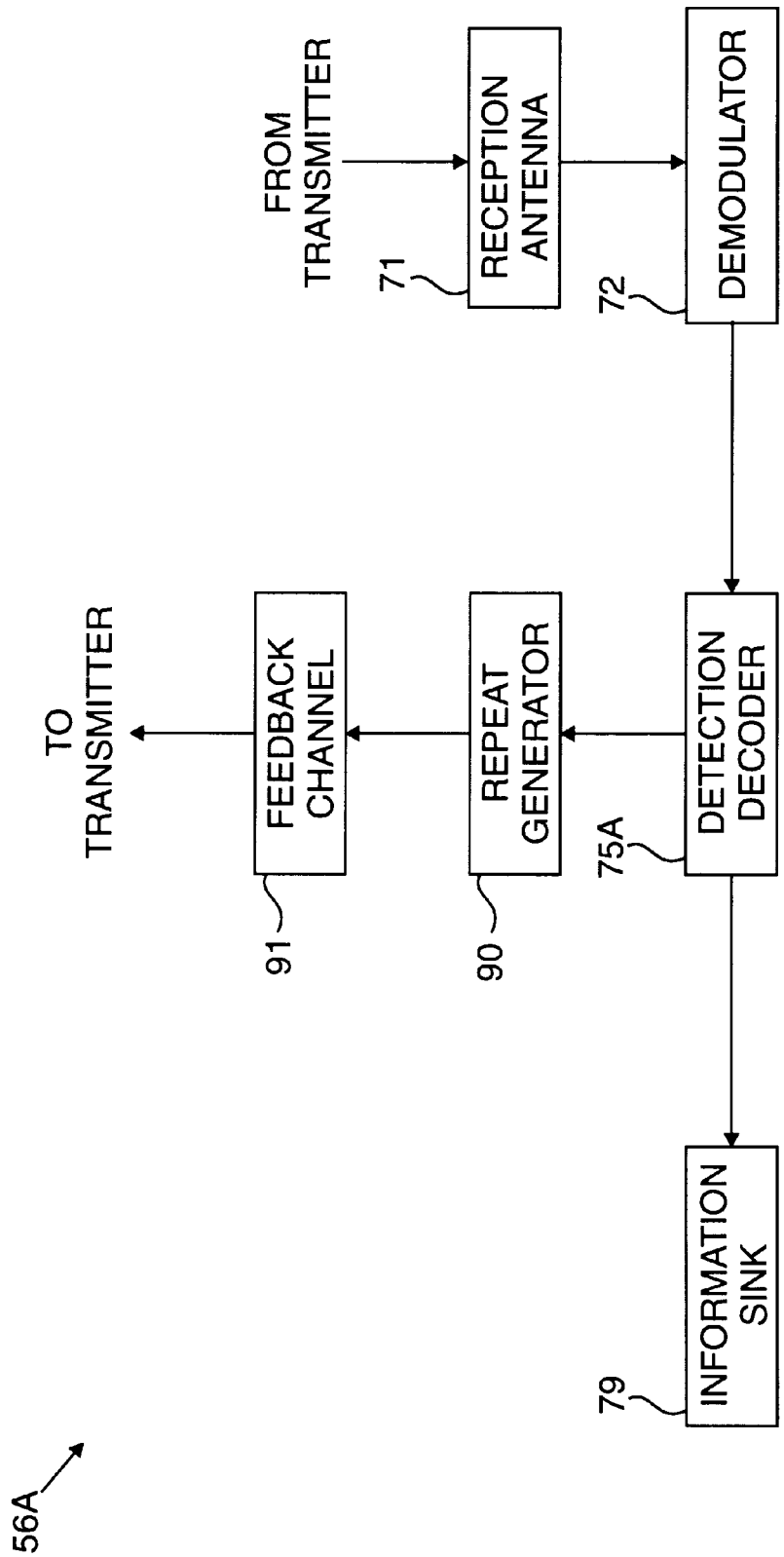

Nondifferential Huffman Coded Frames

| CODE | LENGTH | DESCRIPTION |
|---|---|---|
| 0xffc0 | V | Baseline DCT |
| 0xffc1 | V | Extended sequential DCT |
| 0xffc2 | V | Progressive DCT |
| 0xffc3 | V | Lossless (sequential) |

Differential Huffman Coded Frames

| CODE | LENGTH | DESCRIPTION |
|---|---|---|
| 0xffc5 | V | Differential sequential DCT |
| 0xffc6 | V | Differential progressive DCT |
| 0xffc7 | V | Differential lossless |

Nondifferential Arithmetic Coded Frames

| CODE | LENGTH | DESCRIPTION |
|---|---|---|
| 0xffc9 | V | Extended sequential DCT |
| 0xffca | V | Progressive DCT |
| 0xffcb | V | Lossless (sequential) |

Differential Arithmetic Coded Frames

| CODE | LENGTH | DESCRIPTION |
|---|---|---|
| 0xffcd | V | Differential sequential DCT |
| 0xffce | V | Differential progressive DCT |
| 0xffcf | V | Differential lossless |

FIG. 6A
PRIOR ART

| CODE | LENGTH | DESCRIPTION |
|---|---|---|
| 0xff01 | N | For temporary use in arithmetic coding |
| 0xff02-0xffbf | U | Reserved |
| 0xffc4 | V | Define Huffman table(s) |
| 0xffc8 | U | Reserved for JPEG extensions |
| 0xffcc | V | Define arithmetic conditioning table(s) |
| 0xffd0-0xffd7 | N | Restart with modulo 8 counter |
| 0xffd8 | N | Start of image |
| 0xffd9 | N | End of image |
| 0xffda | V | Start of scan |
| 0xffdb | V | Define quantization table(s) |
| 0xffdc | 4 | Define number of lines |
| 0xffdd | 4 | Define restart interval |
| 0xffde | V | Define hierarchical progression |
| 0xffdf | 3 | Expand reference image |
| 0xffe0-0xffef | V | Reserved for application use |
| 0xfff0-0xfffd | U | Reserved for JPEG extensions |
| 0xfffe | V | Comment |

FIG. 6B

PRIOR ART

FAST FADING PACKET DIVERSITY TRANSMISSION METHOD AND SYSTEM

FIELD OF THE INVENTION

The present invention relates to the field of communications, and more particularly to the field of wireless communication over slow fading channels.

BACKGROUND OF THE INVENTION

One of the problems associated with the transmission of information packets over a wireless communication medium is multipath fading, wherein multiple copies of an information packet reach the receiver over multiple paths with different time delays, amplitudes, and phases due to scattering and reflection and destructively interfere with each other causing the level of the received signal to fall.

If the level of the received signal falls below a usable threshold level, (characterized by a very small signal-to-noise ratio (SNR)) the channel is said to be in a "deep fade." For channels with slow fading characteristics, namely channels whose characteristics vary slowly relative to the data transmission rate, a large number of information packets may be lost if the channel is in a deep fade.

Diversity techniques are used to reduce the effects of multipath fading on slow fading channels. One form of diversity is time diversity. In this protocol, multiple copies of each information packet are interleaved in the packet stream for transmission at different times so that they are subject to independent multipath fading characteristics of the channel. In many applications, the communication delays associated with waiting for the multiple copies of each packet to be received cannot be tolerated.

Another form of diversity is switched antenna diversity. In this protocol, multiple antennas are used one at a time to transmit information packets over a slow fading wireless communication medium. The transmitter switches to another antenna channel, having independent multipath fading characteristics, when the current antenna channel is in a deep fade.

A switched antenna protocol is expensive. Each of the antennas must use a power amplifier rated at the full power P needed to transmit an information packet over the communication medium to the receiver. In addition, abruptly switching the antennas "off" and "on" may damage the power amplifiers.

There is a need for a more cost effective packet diversity transmission method and system which reduces the effects of multipath fading on slow fading channels without the communication delays associated with prior art protocols.

SUMMARY OF THE INVENTION

The present invention provides a packet diversity transmission method and system which reduces the effects of multipath fading on slow fading channels without the communication delays associated with prior art protocols by using induced fast fading packet diversity techniques. Moreover, the transmission system of the present invention is more cost effective than prior art protocols—the power from each antenna amplifier may be inversely proportional to the number of antennas used to transmit the packets, thus reducing the cost of the power amplifiers needed for the antennas.

In one illustrative embodiment of a first set of illustrative embodiments, the transmission method and system of the present invention modulates the information packets to be transmitted and then transmits the modulated packets from M antennas with up to M sets of M fixed phase offsets applied by one or more multipliers, wherein each set of M fixed phase offsets effectively provides a different channel, namely one with independent multipath fading characteristics. In this way, fast fading characteristics are induced on an otherwise slow fading channel.

The M sets of M fixed phase offsets may be used in a variety of ways to reduce the effects of multipath fading on slow fading channels, depending on the application. In one illustrative embodiment, the M sets of M fixed phase offsets may be used to transmit every M packets in a packet stream with channel diversity order M. In another illustrative embodiment, using a repetition code, wherein each packet is transmitted from M antennas M times, a different set of M fixed phase offsets may be used each time the packet is transmitted from the M antennas, providing a rate 1/M repetition code with channel diversity order M.

In further illustrative embodiments of the first set of illustrative embodiments, the M sets of M fixed phase offsets may be used to transmit a first group of information packets and M slow time varying phase offsets may be used to transmit a second group of information packets.

In a second set of illustrative embodiments, ARQ (automatic repeat request) and hybrid ARQ error protection protocols may be used with the fast fading packet diversity transmission method and system of the present invention. Briefly, in these embodiments, the information packets may be transmitted over a forward channel with a first set of M fixed phase offsets until a negative acknowledgement is received from the receiver over a feedback channel indicating that the channel is in a deep fade or otherwise "bad". In the event of a negative acknowledgement, the transmitter transmits the information packets over the forward channel with a second set of M fixed phase offsets. If the first and second set of M fixed phase offsets are applied to a first group of information packets, M slow time varying phase offsets may be applied to the other information packets in the packet stream.

In a third set of illustrative embodiments, the fast fading packet diversity transmission method and system of the present invention may be used to transmit JPEG images with unequal error protection.

BRIEF DESCRIPTION OF THE DRAWINGS

FIGS. 3A–3F show a second set of illustrative embodiments of the present invention using ARQ and hybrid ARQ error protection protocols.

FIGS. 6A–6B are tables listing the start of frame and non-start of frame markers of a JPEG image, respectively.

DETAILED DESCRIPTION OF THE INVENTION

For clarity of explanation, the illustrative embodiments of the present invention set forth below are presented as functional blocks. The functions these blocks represent may be implemented with shared or dedicated hardware, including, but not limited to, hardware capable of executing software. Illustrative embodiments may comprise digital signal processor hardware, such as the AT&T DSP16 or DSP32C, and software performing the operations discussed below. Very large scale integration (VLSI) hardware embodiments of the present invention, as well as hybrid DSP/VLSI embodiments, may also be readily implemented.

The First Set Of Illustrative Embodiments

FIGS. 1A–1D show a first set of illustrative embodiments of a fast fading packet diversity transmission system according to the present invention.

Figure 1A:
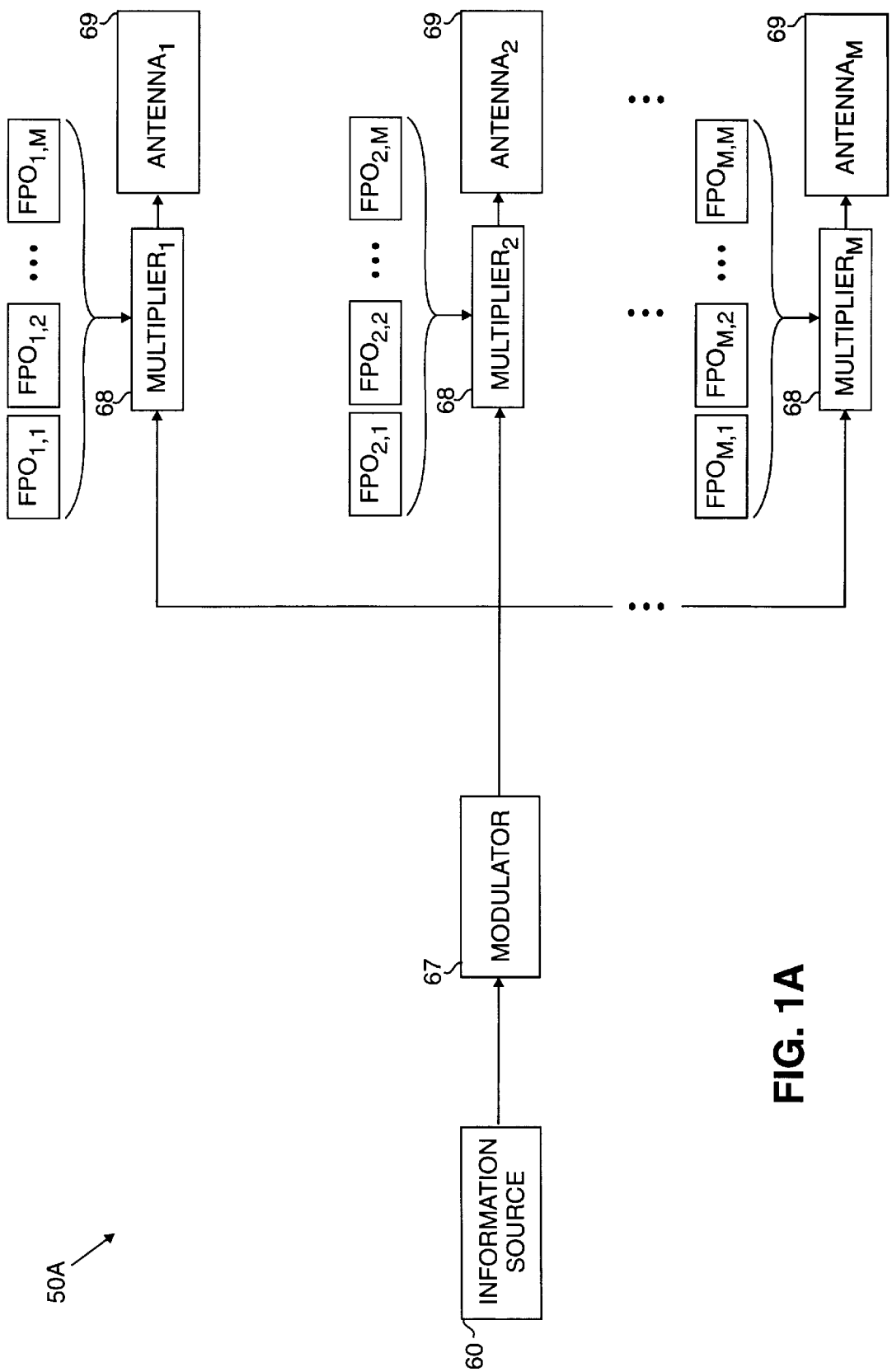
FIGS. 1A–1D show a first set of illustrative embodiments of a fast fading packet diversity transmission system according to the present invention.

The illustrative transmitter 50A in FIG. 1A comprises a modulator 67, a plurality of M multipliers 68, and a plurality of M transmission antennas 69 comprising conventional carrier, pulse shaping, and power amplification circuits.

The modulator 67 modulates the information packets received from information source 60 with a carrier signal. Any suitable modulator known to those of ordinary skill in the art may be used for modulator 67. One suitable modulator is a 4-DPSK modulator.

The plurality of M multipliers 68 are used to apply up to M sets of M fixed phase offsets to the modulated information packets for transmission by the plurality of M antennas 69. It will be apparent to one of ordinary skill in the art that one multiplier, which performs the functions of the plurality of M multipliers 68, may be used.

The M sets of M fixed phase offsets are represented in FIG. 1A by the notations $FPO_{1,1}$–$FPO_{M,M}$; the first subscript refers to the fixed phase offset associated with a particular antenna, and the second subscript refers to the particular set of phase offsets it belongs to. The sets of M fixed phase offsets are vertically positioned (i.e. in columns) in FIG. 1A.

In a preferred embodiment M sets of M fixed phase offsets associated with M antennas may be determined from the following equation:

$$\theta_i(l) = \frac{2\pi}{M}(i-1)(l \bmod M)$$

The letter l corresponds to the set of M fixed phase offsets being used to transmit the modulated information packets; l=1 to M. The letter i corresponds to the fixed phase offset of a set of phase offsets that is being used to transmit the modulated information packets from the ith antenna; i=1 to M. The notation l mod M represents the modulo M value of l. The phase offsets are constant for the duration of the packet.

For the preferred embodiment, the M sets of M fixed phase offsets for a transmission system according to the present invention using three transmission antennas, M=3 are:

| | First Set (l = 1) | Second Set (l = 2) | Third Set (l = 3) |
|---|---|---|---|
| (i = 1) | 0 | 0 | 0 |
| (i = 2) | 0 | $\frac{-2\pi}{3}$ | $\frac{-4\pi}{3}$ |
| (i = 3) | 0 | $\frac{+2\pi}{3}$ | $\frac{+4\pi}{3}$ |

It will be understood by those of ordinary skill in the art that the M sets of M fixed phase offsets may be determined from other equations and may be applied in a variety of ways to reduce the effects of multipath fading on slow fading channels, depending on the application.

Figure 2A:
FIGS. 2A–2C show exemplary portions of the packet streams associated with the first set of illustrative embodiments of the present invention.

In one illustrative embodiment, the M sets of M fixed phase offsets may be applied to every M packets in the packet stream providing channel diversity order M for every M packets, meaning that each of the M packets is transmitted on the channel with relatively independent multipath fading characteristics. FIG. 2A shows a portion of the packet stream for this embodiment. The subscript shown for each information packet in FIG. 2A represents the set of M fixed phase offsets applied by the M multipliers 68 shown in FIG. 1A to the transmitter packet.

As shown in FIG. 2A, Packet 1 is being transmitted by the M antennas with a first set of M fixed phase offsets; Packet 2 is being transmitted by the M antennas with a second set of M fixed phase offsets; and Packet M is being transmitted by the M antennas with an Mth set of M fixed phase offsets. As also shown in FIG. 2A, the process is repeated for every M packets in the packet stream.

Figure 1B:
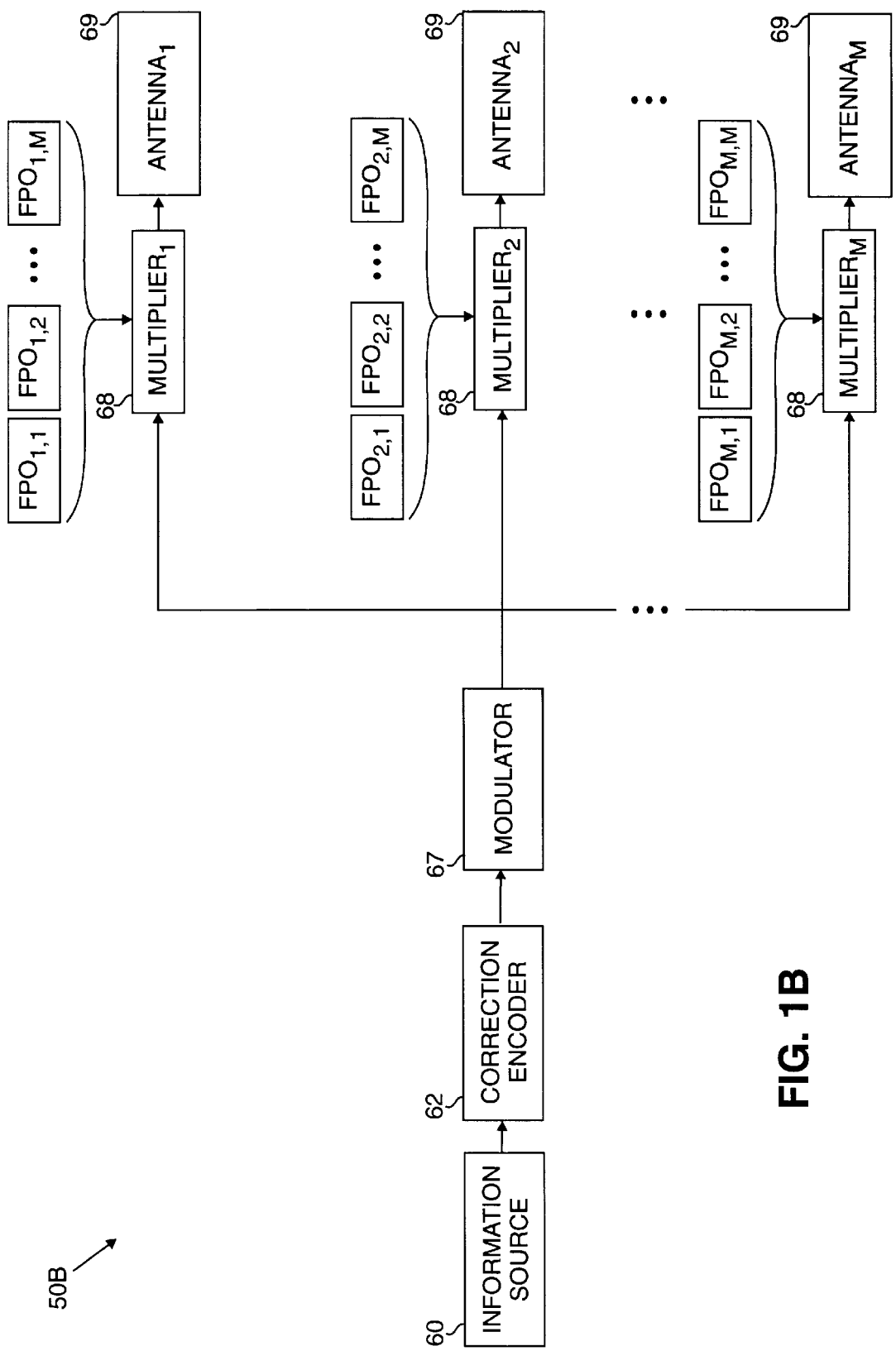

Another illustrative embodiment is shown in FIG. 1B. The transmitter 50B shown in FIG. 1B is the same as transmitter 50A shown in FIG. 1A, with one exception: an error correction encoder 62 is operably coupled between the information source 60 and modulator 67. The error correction encoder 62 encodes the information packets with an error correction code in advance of modulation. The present invention functions to improve the error correcting capability, i.e., the error protection power, of the error correction code. Any suitable forward error correction (FEC) code may be used, including, but not limited to, block codes and convolutional codes.

Figure 2B:
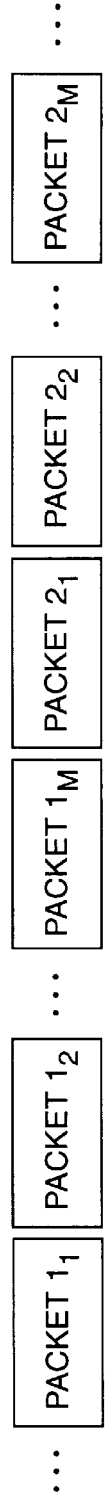

By way of example, the M sets of M fixed phase offsets may be used in conjunction with a repetition-type block code, wherein each packet in the packet stream is transmitted by the M antennas, M times. The M sets of M fixed phase offsets may be used to transmit each packet M times, providing a rate 1/M repetition code with channel diversity order M, as illustrated by the packet stream in FIG. 2B.

The channel diversity order M refers to the fact that each time the packet is transmitted over the wireless communication medium it is subject to independent multipath fading characteristics, thereby providing the receiver with M uncorrelated copies of the information packet to be combined using combining methods known to those of ordinary skill in the art.

It will be understood by those of ordinary skill in the art that a rate 1/M repetition code may be used where N<M.

Figure 1C:
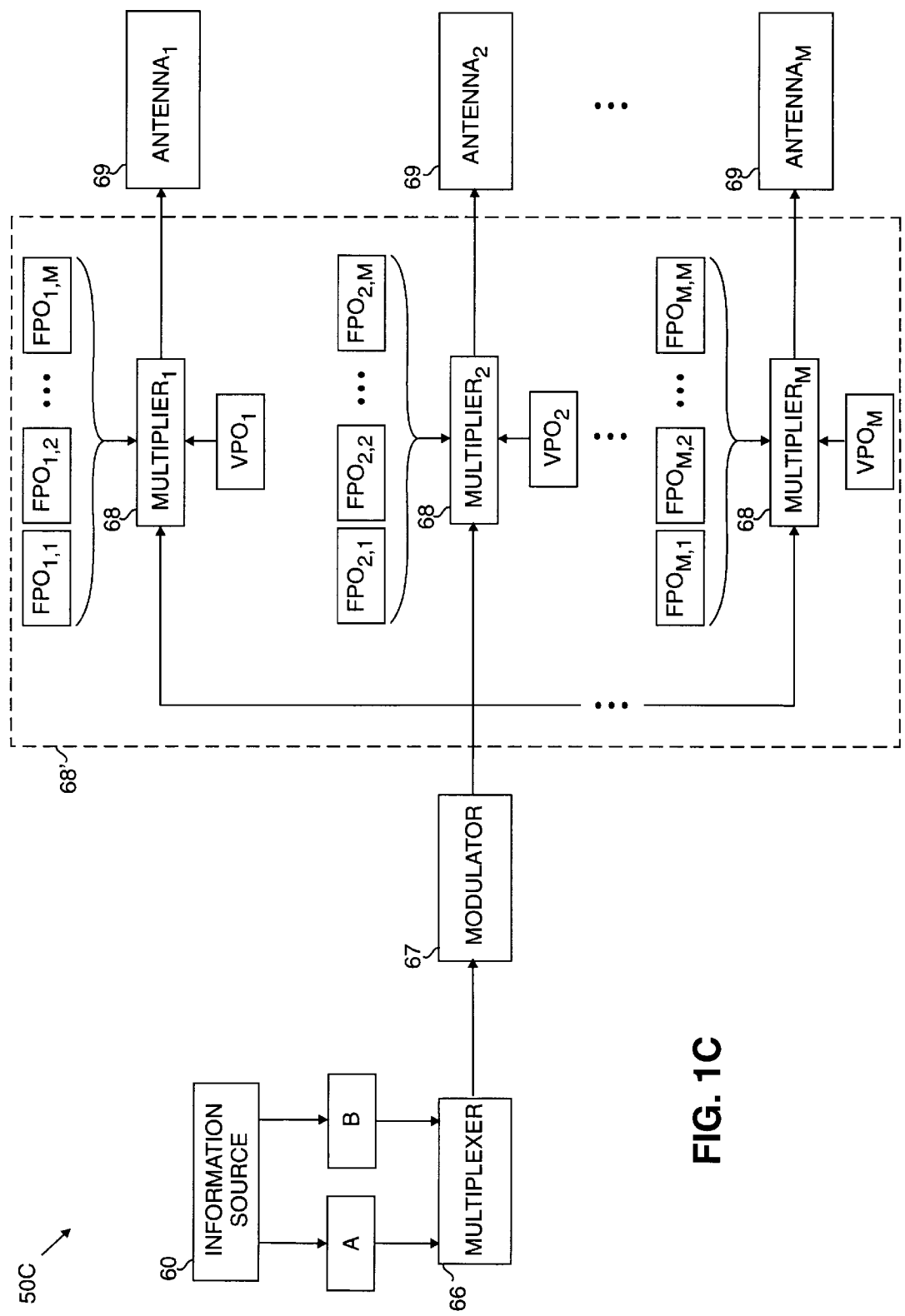

The transmitter 50A of FIG. 1A may also be modified, as shown by transmitter 50C in FIG. 1C, to transmit one group of information packets with up to M sets of M fixed phase offsets and another group of information packets with M slow time varying phase offsets. For simplicity, the groups of information packets are referred to as groups A and B.

As shown in FIG. 1C, the groups of information packets are input from information source 60. The information packets from groups A and B are then multiplexed by multiplexer 66 and modulated by modulator 67, although it will be understood by those of ordinary skill in the art that the groups of information packets may be transmitted at non-overlapping time intervals. It will also be understood by those of ordinary skill in the art that the groups of information packets may be multiplexed for transmission after modulation rather than in advance of modulation.

Figure 2C:

Once the groups of information packets are multiplexed together and modulated, phase offsets are applied by the M multipliers 68. For purposes of illustration, the information packets in group A may be transmitted using M sets of M fixed phase offsets for every M group A packets in the manner set forth above, as illustrated by the packet stream of FIG. 2C. As to the group B information packets, they may be transmitted with M slow time varying phase offsets which may be applied by the M multipliers 68 along with an induced amplitude $A_i(n)$ in the manner set forth below. The time varying phase offsets (VPOs) are illustrated in FIG. 1C by the notation $VPO_1-VPO_M$.

The induced amplitude $A_i(n)$ in one embodiment may be determined from the following equation:

$$A_i(n) = \frac{1}{\sqrt{M}}$$

The M slow time varying phase offsets in one embodiment may be determined from the following equation:

$$\theta_i(n) = 2\pi f_i n T_d$$

where i corresponds to the transmission antenna the slow time varying phase offset is associated with, (i=1 to M); n corresponds to the phase offset at a particular time; $f_i$ corresponds to the induced frequency offset at the ith antenna; and $T_d$ corresponds to the symbol duration. The slow time varying phase offsets vary on an symbol by symbol (bit by bit basis) within the packet.

The induced frequency offset $f_i$ in one embodiment may be determined from the following equation:

$$f_i = \frac{-(M-1)}{2} f_\Delta + (i-1) f_\Delta,$$

where $f_\Delta$ is a small percentage of the data transmission rate. If $f_\Delta$ is too large the receiver will lose phase coherence and function unreliably, in which case the demodulation error will dominate the overall performance.

For example, for a transmission system according to the present invention having three antennas (M=3) and a data transmission rate of 8 kbits/sec, a suitable $f_\Delta$ may be 2% of the data transmission rate ($f_\Delta$=160 Hz), providing frequency offsets of −160 HZ for the first antenna (i=1), 0 Hz for the second antenna (i=2), and +160 Hz for the third antenna (i=3).

The M slow time varying phase offsets may be determined using different equations depending on the application. The best phase offsets will depend on channel variations and the error correction code used.

Figure 1D:
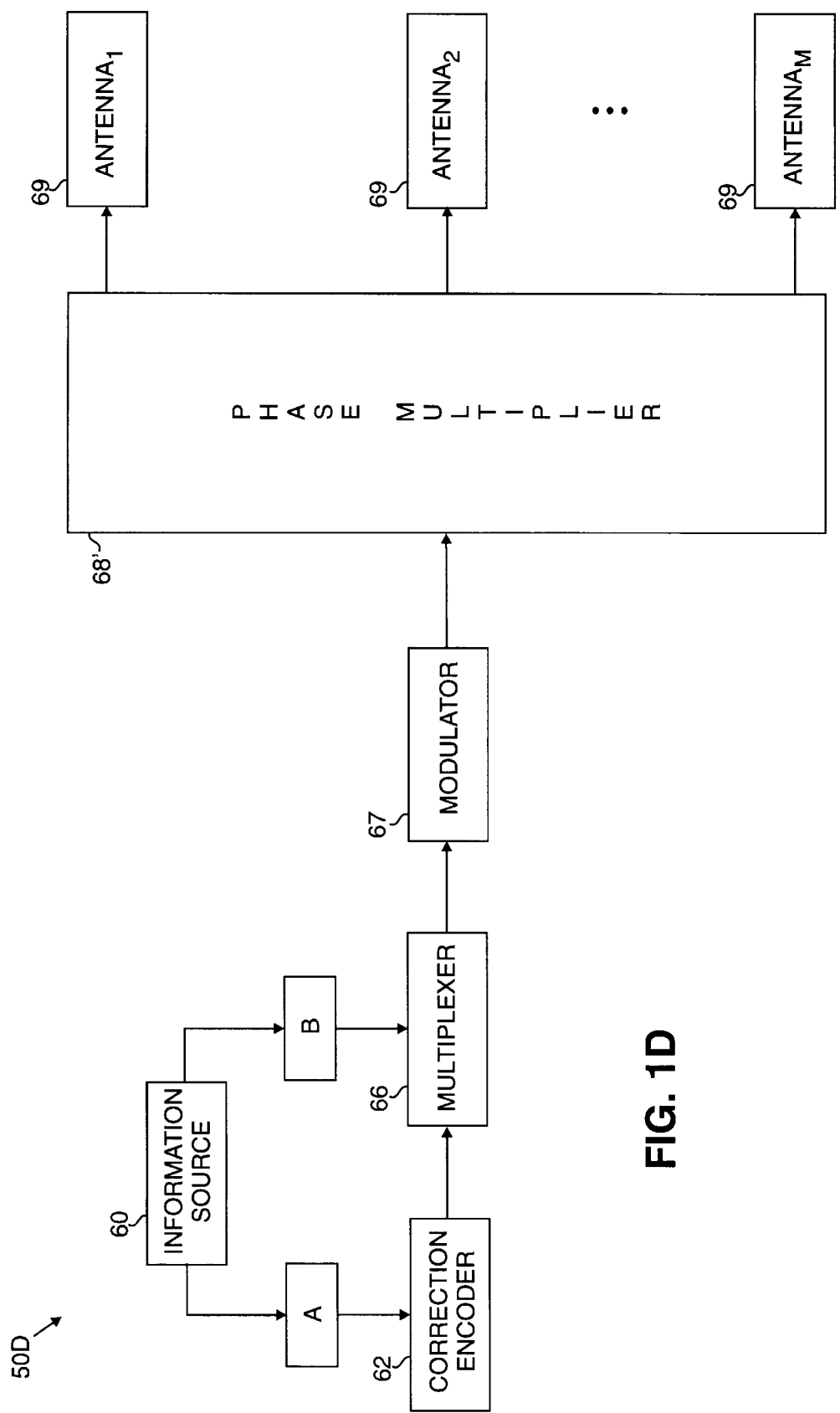

FIG. 1D shows a further illustrative embodiment of the present invention. This illustrative embodiment is a modification of the FIG. 1C embodiment just discussed. This embodiment operates in the same manner as the FIG. 1C embodiment, with one exception: the error correction encoder 62 shown in FIG. 1B is used in advance of modulation to encode the group A information packets with an FEC code. Although not shown in FIG. 1D, an error correction encoder may also be used to encode the group B information packets with any suitable FEC code. Again, the present invention serves to improve the error correcting capability of an FEC code.

The Second Set Of Illustrative Embodiments

A second set of illustrative embodiments are shown in FIGS. 3A–3F. These illustrative embodiments use an ARQ or hybrid ARQ error protection protocol.

For some background, in an ARQ protocol the transmitter appends an error detection code comprising parity check bits to the information packets before transmission. The parity check bits enable the receiver to detect errors in the data packets. Following transmission of each packet over a forward communication channel, the transmitter waits for a positive or negative acknowledgement from the receiver.

If no errors are detected in a received information packet, the packet is delivered to an information sink and a positive acknowledgement (ACK) is sent over a feedback channel to the transmitter. The transmitter responds to the positive acknowledgement by sending the next information packet to the receiver.

If, on the other hand, an error is detected in a received information packet, the receiver discards that information packet and sends a negative acknowledgement (NAK) over a feedback channel to the transmitter. The transmitter responds to the negative acknowledgement by re-transmitting the erroneous information packet.

Hybrid ARQ protocols use both an error detection code and an error correction code. In one hybrid ARQ protocol, an erroneous information packet is re-transmitted only if it cannot be corrected by the error correction code. In another hybrid ARQ protocol, the packets are encoded with an error correction code only when necessary, such as, for example, in response to a negative acknowledgement.

Figure 3A:
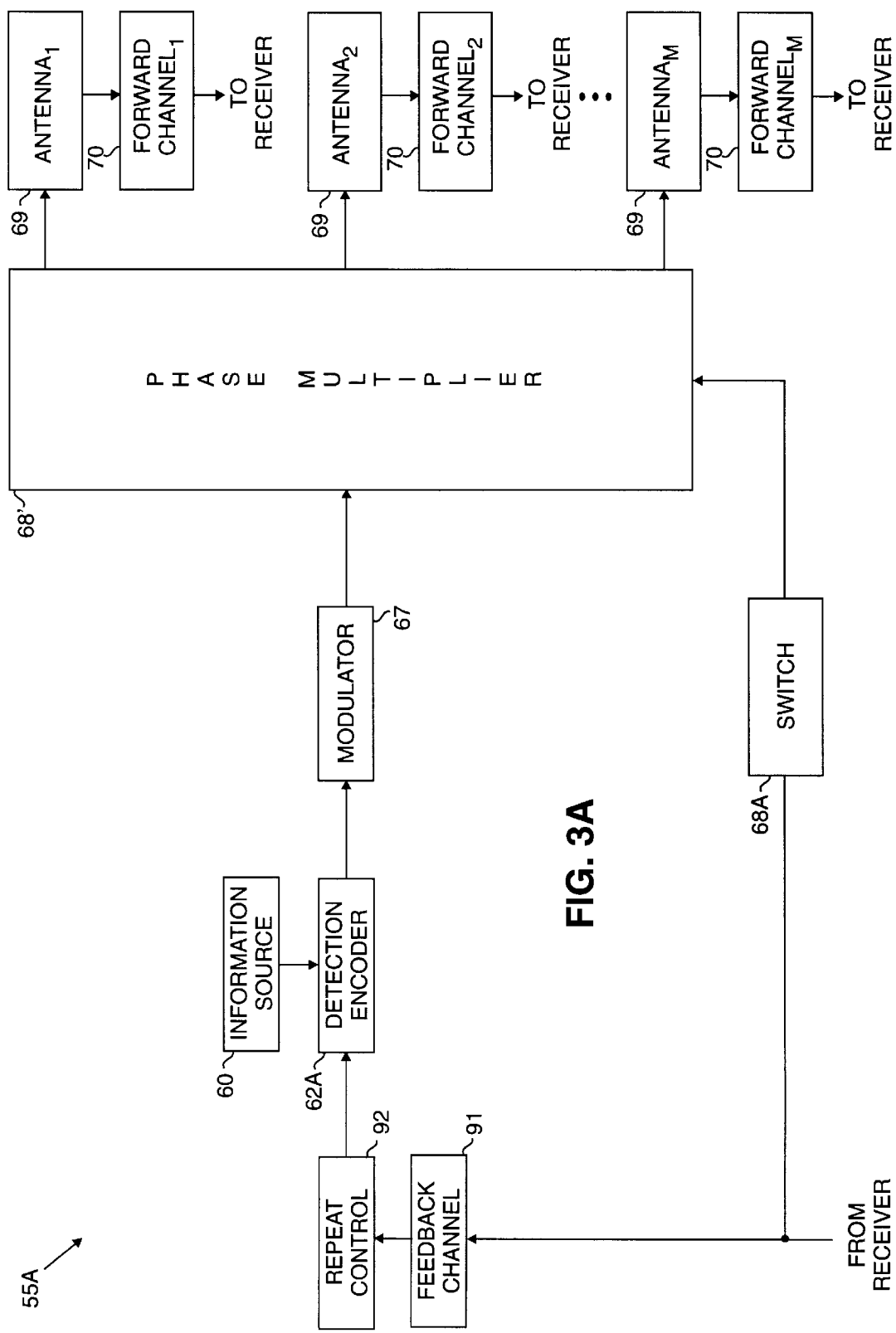

FIGS. 3A and 3B show one illustrative ARQ embodiment of the present invention. FIG. 3A shows an illustrative transmitter 55A and FIG. 3B shows an illustrative receiver 56A.

The transmitter 55A in FIG. 3A comprises an error detection encoder 62A, a modulator 67, a phase multiplier 68', a switch 68A, a plurality of M antennas 69, and a repeat controller 92.

The receiver 56A in FIG. 3B comprises one or more reception antennas 71 (comprising, e.g., low noise amplifiers, RF/IF band-pass filters, and a match filter). The receiver 56A also includes a demodulator 72, an error detection decoder 75A, and a repeat generator 90.

In operation, the transmitter 55A receives information packets from information source 60, as shown in FIG. 3A. The information packets are encoded by error detection encoder 62A with a suitable error detection code known to those of ordinary skill in the art. The error detection code enables the receiver to detect transmission errors in the information packets. One suitable error detection encoder is a CRC-16 encoder which encodes the information packets with a 16-bit cyclic redundancy code.

In this illustrative embodiment, once the packets have been encoded with an error detection code, they are modulated by a suitable modulator 72, such as a 4-DPSK modulator, and transmitted over forward channel 70 by the M antennas 69 with a first set of M fixed phase offsets applied by phase multiplier 68' in the manner described above for the first set of illustrative embodiments.

The reception antenna 71 in FIG. 3B is used to receive the information packets that are transmitted by transmitter 55A.

Once received, the information packets are demodulated by a suitable, complementary demodulator 72. For a 4-DPSK modulator, a suitable demodulator is a 4-DPSK demodulator.

The error detection decoder 75A decodes the demodulated information packets to determine whether there are transmission errors in any of the packets. The error detection encoder 75A may be any suitable, complementary error detection decoder. For example, for a CRC-16 encoder, a suitable decoder is a CRC-16 decoder.

The error detection decoder 75A normally regenerates the error detection code for each information packet and compares it against the error detection code transmitted with the information packet. If the two codes match, presumably there are no errors in the transmitted packet. If the two codes do not match, there are one or more errors in the transmitted packet.

Figure 4A:
FIGS. 4A–4D show exemplary portions of the packet streams associated with the second set of illustrative embodiments of the present invention.

If there are errors in an information packet, the information packet is normally discarded, and a negative acknowledgement (NAK) is transmitted over feedback channel 91 by repeat generator 90 to transmitter 55A. In response to the negative acknowledgement, transmitter 55A transmits the packet again, but this time with a second set of M fixed phase offsets, as shown for Packet 1 in the packet stream of FIG. 4A.

In more detail, repeat controller 92 of transmitter 55A responds to the negative acknowledgement by re-transmitting the erroneous information packet. Each transmitted packet may be stored before transmission in a buffer or other suitable memory device so that it is readily available for retransmission.

The transmitter 55A also responds to the negative acknowledgement (NAK) by actuating switch 68A which, in turn, applies a second set of M fixed phases to the modulated information packet in place of the first set of M fixed phases. The switch 68A may select up to M sets of M fixed phase offsets.

The switch 68A may be any suitable device known to those of ordinary skill in the art which functions to change the sets of M fixed phase offsets applied by phase multiplier 68'. For example, the switch 68A may be an electronic switch or a magnetic switch. Moreover, switch 68A may be a hardware switch or a programmable software switch.

Figure 4B:
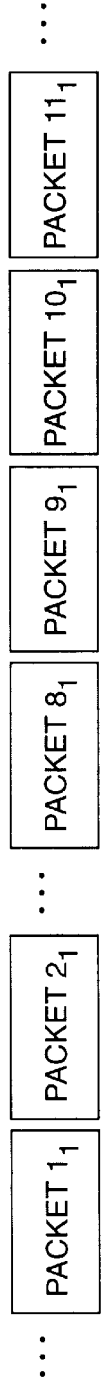

If there are no errors in an information packet, the packet is forwarded to information sink 79 in FIG. 3B and a positive acknowledgement (ACK) is sent by repeat generator 90 over feedback channel 91 to transmitter 55A in FIG. 3A. In response to the positive acknowledgement, the repeat controller 92 of transmitter 55A sends the next data packet with the same set of M fixed phase offsets, as shown by the packet stream in FIG. 4B.

Figure 3C:
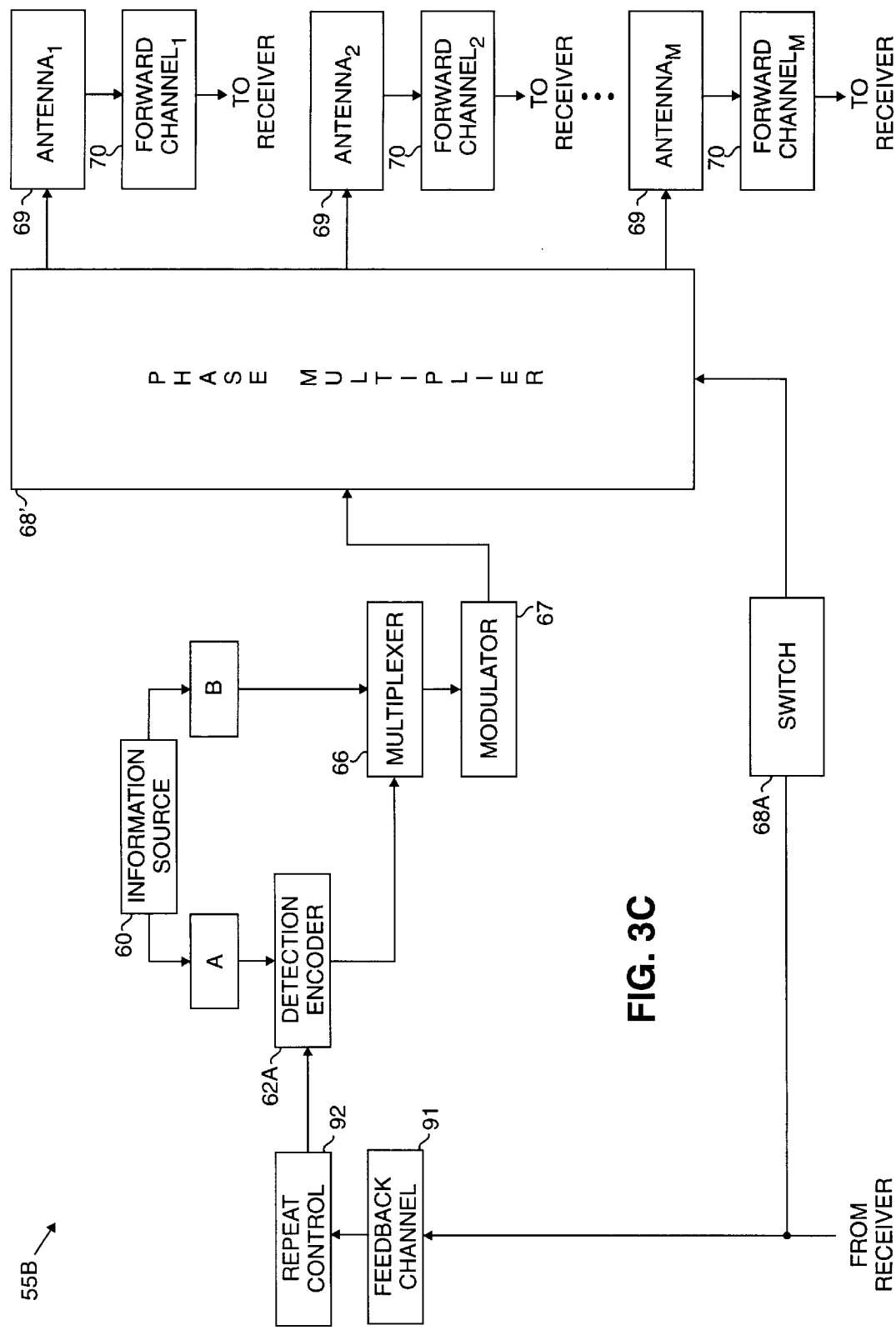
Figure 3D:
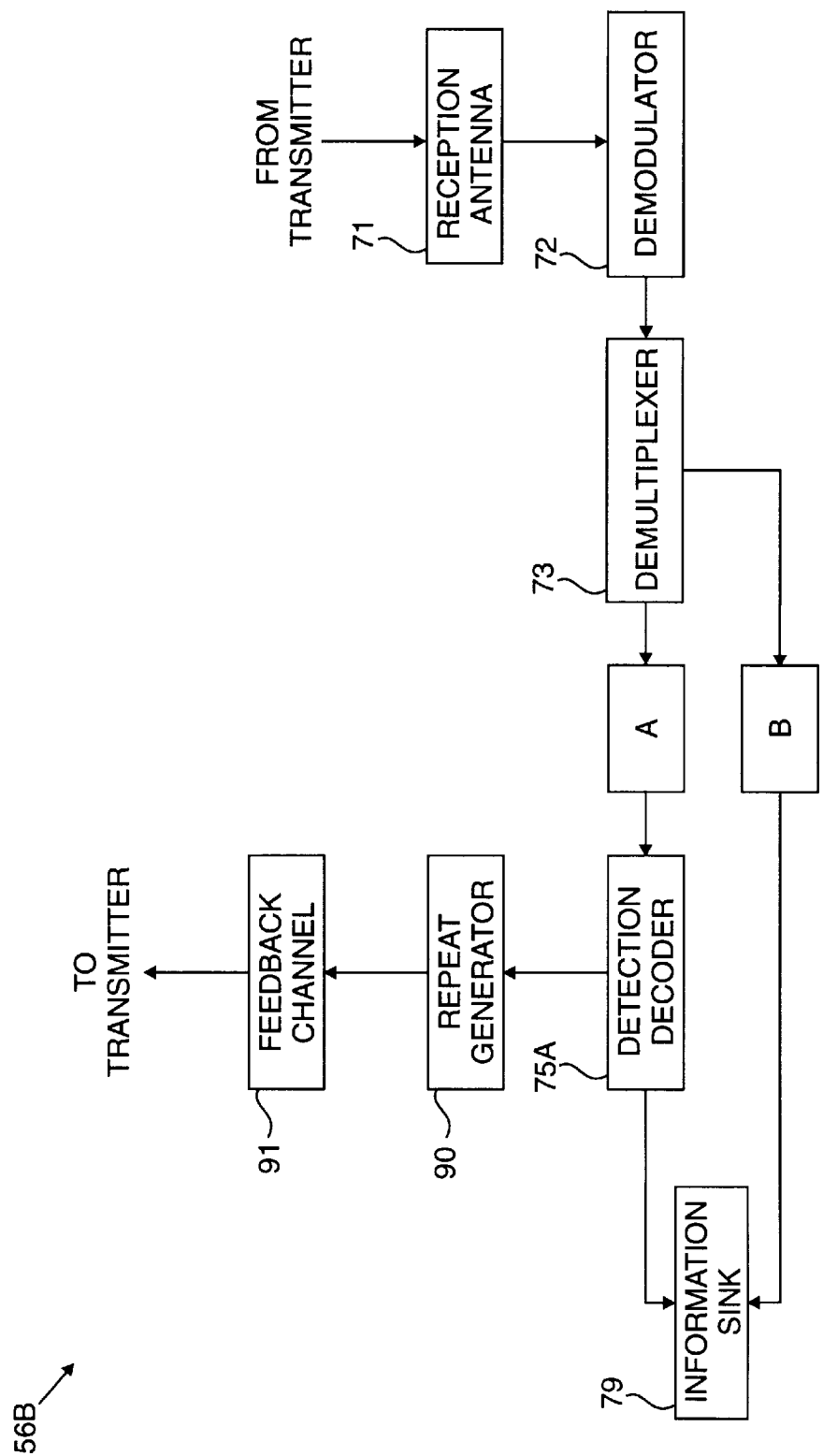

In a further illustrative ARQ embodiment, shown in FIGS. 3C and 3D, the present invention transmits groups (or types) of information packets. FIG. 3C shows an illustrative transmitter 55B and FIG. 3D shows an illustrative receiver 56B. The transmitter 55B is a modification of the transmitter 55A shown in FIG. 3A, and the receiver 56B is a modification of the receiver 56A shown in FIG. 3B. A multiplexer-demultiplier pair 66, 73 has been added.

The group A information packets are transmitted with an ARQ protocol in the manner described above for the information packets of transmitter 55A in FIG. 3A. The group B packets may be transmitted during non-overlapping time intervals or, alternatively, as shown in FIG. 3C, multiplexed by multiplexer 66 in the time slots left idle between ARQ-based transmissions of group A information packets, during which the transmitter 55B waits for a positive or negative acknowledgement from the receiver over feedback channel 91. Although not shown in FIG. 3C, the group B packets may also be encoded with a suitable FEC code using the error correction encoder 62 shown in FIG. 1B.

Figure 4C:

FIG. 4C shows one example of the flow of multiplexed group A and group B information packets transmitted by transmitter 55B over a wireless communication medium. As shown in FIG. 4C, the group A packets are transmitted with a first set of M fixed phase offsets and the group B information packets are multiplexed in the time slots $t_d$. The group B information packets may be transmitted without phase offsets or, alternatively, may be transmitted with M slow time varying phase offsets.

FIG. 4C shows a portion of a packet stream where no errors are detected by receiver 56B in a transmitted group A packet, Packet A1. In this situation, the repeat generator 90 of receiver 56B sends a positive acknowledgement (ACK) to the transmitter 55B after receiving Packet A1, and the transmitter 55B responds by sending the next information packet, Packet A2, with the same set of M fixed phase offsets.

Figure 4D:

FIG. 4D shows the packet flow in a situation where errors are detected in Packet A1 by the error detection encoder 75A of receiver 56B. In this situation, the repeat generator 90 of receiver 56B transmits a retransmission request (negative acknowledgement) over feedback channel 91 in response to which the transmitter 55B retransmits Packet A1 with a second set of M fixed phase offsets.

Figure 3E:
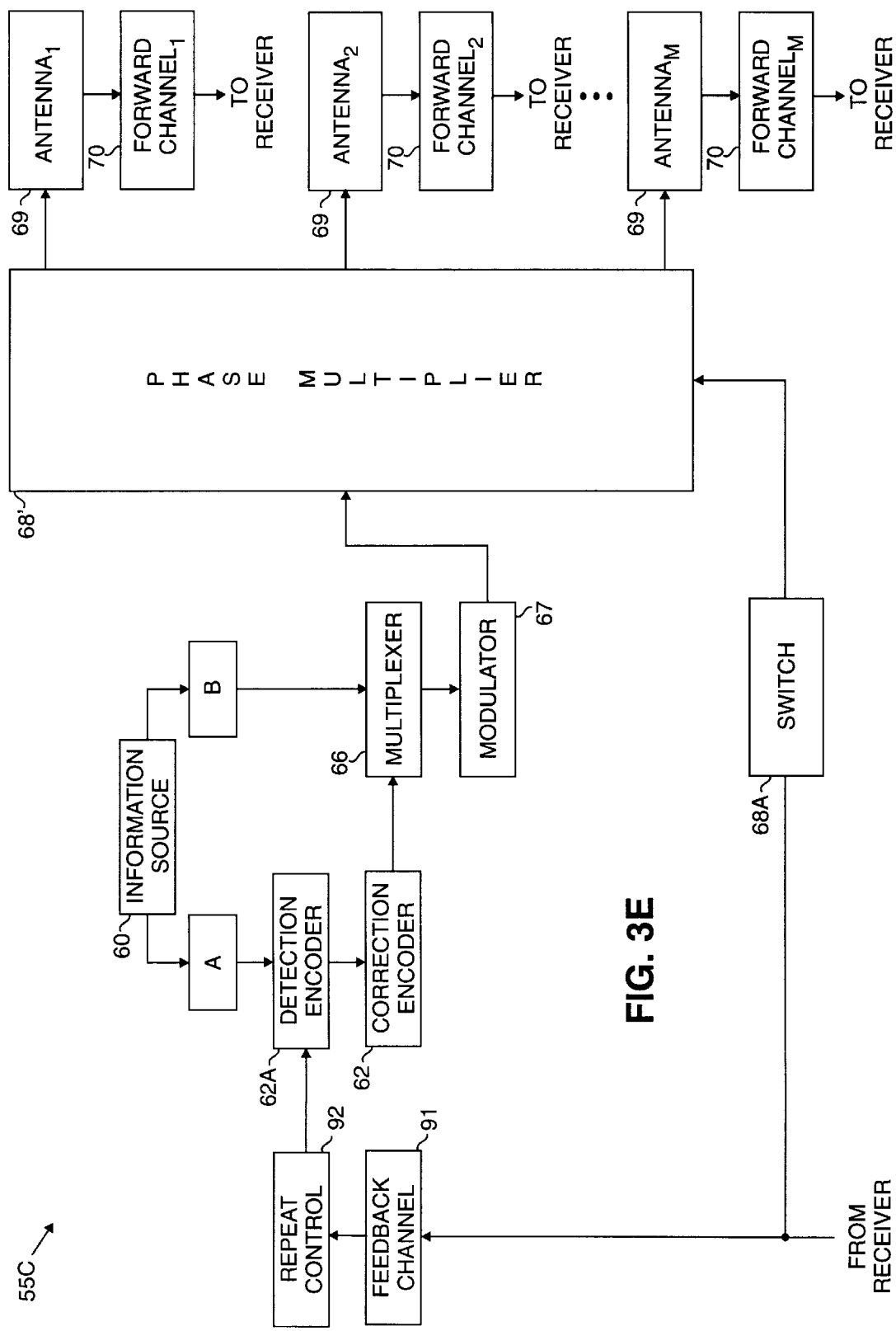
Figure 3F:
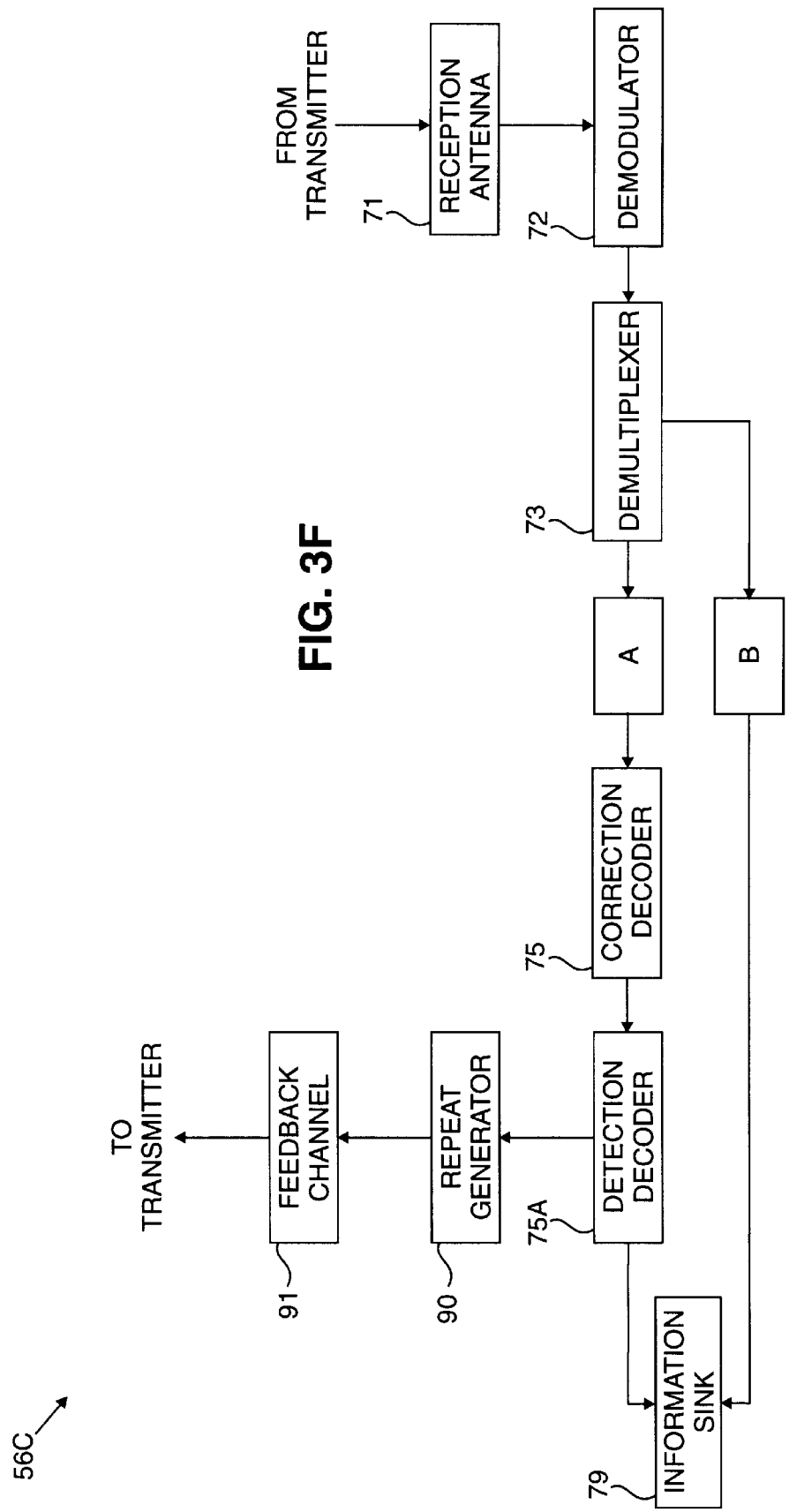

FIGS. 3E and 3F show an illustrative hybrid ARQ embodiment of the present invention. FIG. 3E shows a transmitter 55C and FIG. 3F shows a receiver 56C.

For this embodiment, the transmitter 55B of FIG. 3C has been modified to include the error correction encoder 62 of FIG. 1B for encoding the group A information packets with an FEC code. Otherwise the two transmitters are the same. The receiver 56B of FIG. 3D has also been modified to include a complementary error correction decoder 75 using, for example, the Viterbi algorithm for decoding. Otherwise the two receivers are the same.

In this hybrid ARQ embodiment, the transmitter 55C encodes the group A information packets with an error detection code and an error correction code. As shown in FIG. 3F, the receiver 56C attempts to correct the errors in an information packet first, by way of error correction decoder 75, before requesting that the packet be retransmitted in the manner described above in connection with the transmitter 55B and receiver 56B of FIGS. 3C and 3D, respectively.

Introduction To JPEG Illustrative Embodiments

The present invention is particularly suited for JPEG image transmission. The present invention therefore may be used with the unequal error protection embodiments of the Weerackody patent application entitled "TRANSMISSION METHOD AND SYSTEM FOR JPEG IMAGES," Application Serial No. [insert when assigned], (Attorney Docket No. 22269.9989) filed on Mar. 31, 1995, ("the Weerackody JPEG application") which is incorporated herein by reference.

JPEG is the international standard for still image compression. JPEG is named after the group that developed the international standard—the Joint Photographic Experts Group. A complete description of the JPEG standard is given in W. B. Pennebaker, J. L. Mitchell, *JPEG Still Image Data Compression Standard* (Van Norstrand Reinhold, New York 1993).

JPEG compressed image data contains two classes of segments: (i) entropy coded segments, representing 16×16 blocks of the image, and (ii) markers or marker segments, which contain header information, transformation and quantization tables, and other information required for the data sink to interpret and decode the entropy coded image data. Included among the markers are restart markers which separate the entropy coded segments.

Figure 5:
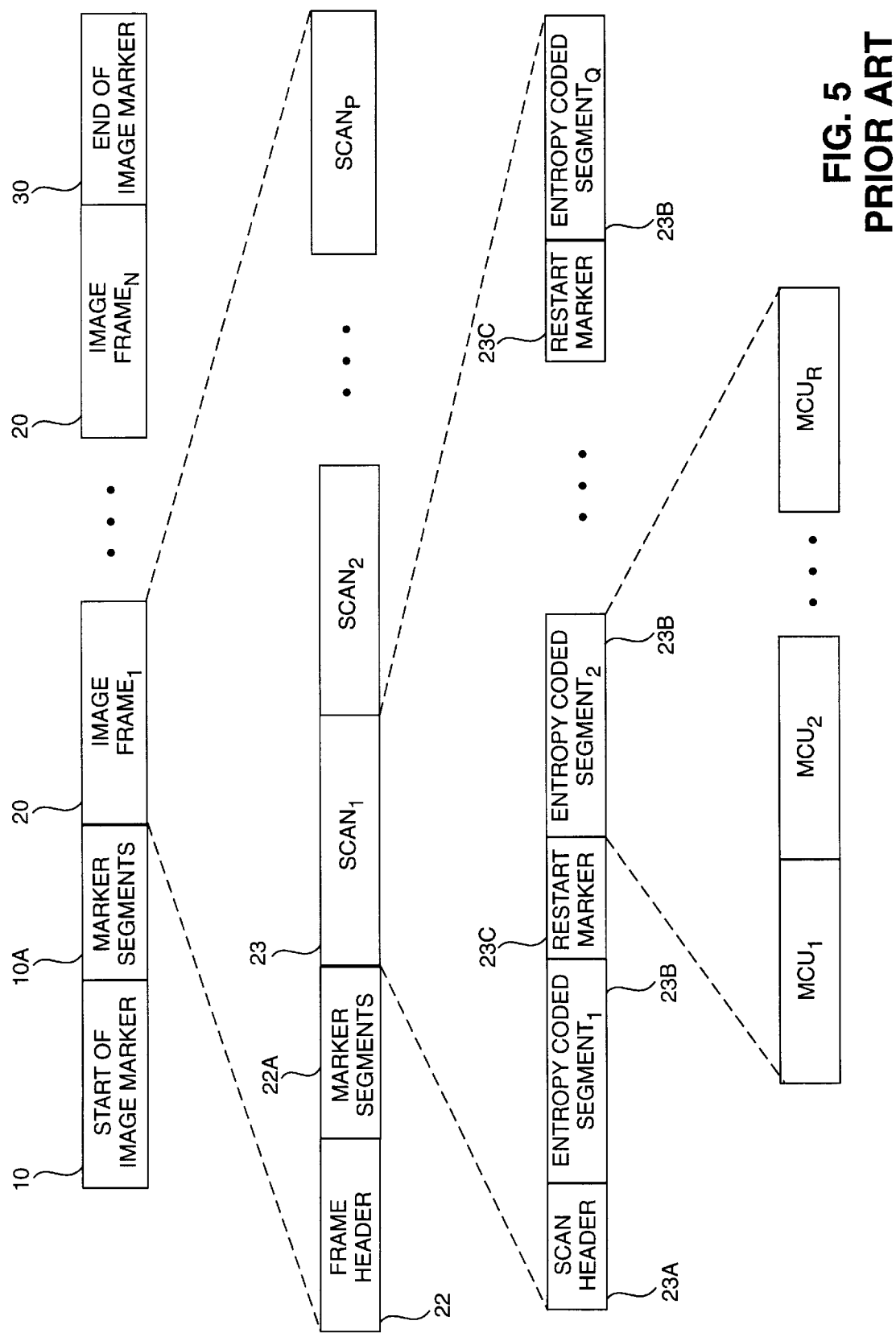
FIG. 5 shows the structure of a typical JPEG compressed image.

FIG. 5 shows the structure of a typical JPEG coded image 50. A start of image marker 10 and marker segments 10A begin one or more image frames 20 (i.e., the compressed image data stream), and an end of image marker 30 terminates the image frame or frames. The marker segments 10A define quantization tables, entropy-coding (transformation) tables, and other miscellaneous parameters.

A frame header 22 and marker segments 22A are generated at the beginning of each image frame.20. The frame header 22 begins with a start of frame marker followed by parameter values needed for decoding the frame. For example, the frame header defines the basic attributes of the image, including image size, number of image components, the mode of compression, and the entropy coder used within the frame. Like the marker segments preceding the image frame, marker segments 22A also define quantization tables, entropy coding (transformation) tables, and other miscellaneous parameters.

Each image frame 20 is composed of one or more scans 23 through the image data, where a scan is a single pass through the data for one or more components of the image. The components of each scan are grouped into one or more entropy coded segments 23B which are separated by restart markers 23C. The components in each entropy coded segment are further grouped into one or more minimum coded units ("MCUs") generally representing 16×16 blocks of the image.

Appended to the beginning of each scan in an image frame 20 is a scan header 23A. The scan header 23A begins with a start of scan marker followed by parameter values needed for decoding the scan, such as the number of components in the scan and the scan component specification.

Marker segments begin with a "marker" which is a two-byte hexadecimal code or word. The first byte is always a byte-aligned 0xff (0x representing that the bytes in the image data stream are in hexadecimal form and the hexadecimal byte ff signifying a marker). The second byte is a "marker code" which identifies the function of the marker segment. The second byte is always a non-zero byte.

For example, the start of image marker is 0xffd8 and the end of image marker is 0xffd9. In both cases, the byte ff denotes a marker, and the marker codes d8 and d9 identify the markers as the start of image and end of image markers, respectively.

The tables in FIGS. 6A and 6B list the markers in a JPEG image: the table in FIG. 6A includes the start of frame markers (defining the entropy encoding procedure used), a:)d the table in FIG. 6B includes all of the other, non-start of frame markers.

These markers fall into two categories: those without parameters, and those followed by a fixed, undefined, or variable length sequence of parameters. A "V" notation in the length column of the tables in FIGS. 6A and 6B represents a variable length parameter with a known structure; an "N" notation in the length column represents that no parameter sequence follows the marker; a "U" notation in the length column represents that the parameter sequence is undefined; and a numeric notation in the length column represents a fixed number of parameter bytes following the marker.

For example, in FIG. 6B the restart marker 0xffd0 has no parameters; the parameters of the define restart interval marker 0xffdd are contained in the 4 bytes immediately following 0xffdd; and the start of scan marker 0xffda contains a variable-length parameter sequence.

The first parameter in any marker segment is always a two-byte code representing the length of the parameter sequence. For example, a two-byte code 0x0043 following the quantization table marker 0xffdb would represent that there are 67 parameter bytes following the marker, including the two-byte length parameter.

Markers with parameters following them are generally referred to as marker segments but the terms are used interchangeably in this application.

As discussed in detail in the Weerackody JPEG patent application, some portions of the JPEG image are more sensitive to transmission errors than others. Specifically, the markers or marker segments have been determined to be more sensitive than the entropy coded segments. The marker segments are defined as Type-I information and the entropy coded segments are defined as Type-II information.

Because the restart markers have been determined to be less sensitive than any of the other markers, the Type-I information may be further separated into Type-IA and Type-IB information. The restart markers are defined as Type-IB information and the other markers are defined as Type-IA information.

The transmission system of the Weerackody JPEG patent application takes into account the sensitivity of each of the different types of JPEG information and uses "unequal error protection" during transmission. The most powerful error protection is applied to the Type-IA information—which is the most sensitive to transmission errors. The same or a lesser level of protection is applied to the Type-IB information. Finally, the lowest level of error protection is applied to the Type-II information—the least sensitive of the three types of information.

The power of an error protection protocol is usually measured by its minimum "free distance," which is a term known to those of ordinary skill in the art. The greater the free distance of an error protection protocol the more powerful the error protection. Error protection power may also be measured by the average bit error rate (BER) for the same signal-to-noise ratio (SNR), but only if the BER of the channel is relatively constant over time. The smaller the BER of an error protection protocol the more powerful the error protection.

Applying unequal error protection serves to reduce the overhead or bandwidth (i.e., the number of redundant bits) required for error protection, and thereby increases the throughput of the transmission system and more efficiently uses the communication channel. These advantages can be more fully appreciated by considering the relative contributions of each type of information to the JPEG image. The most important type of information, the Type-IA information, typically takes up less than 1% of the JPEG image data stream, and the Type-IB information typically takes up only 5–10% of the JPEG image data stream. The rest of the JPEG image data stream consists of the least error sensitive Type-II information.

The Third Set Of Illustrative Embodiments

A third set of illustrative embodiments of the present invention is shown in FIGS. 7A–7H for transmitting JPEG images with unequal error protection.

Figure 7A:
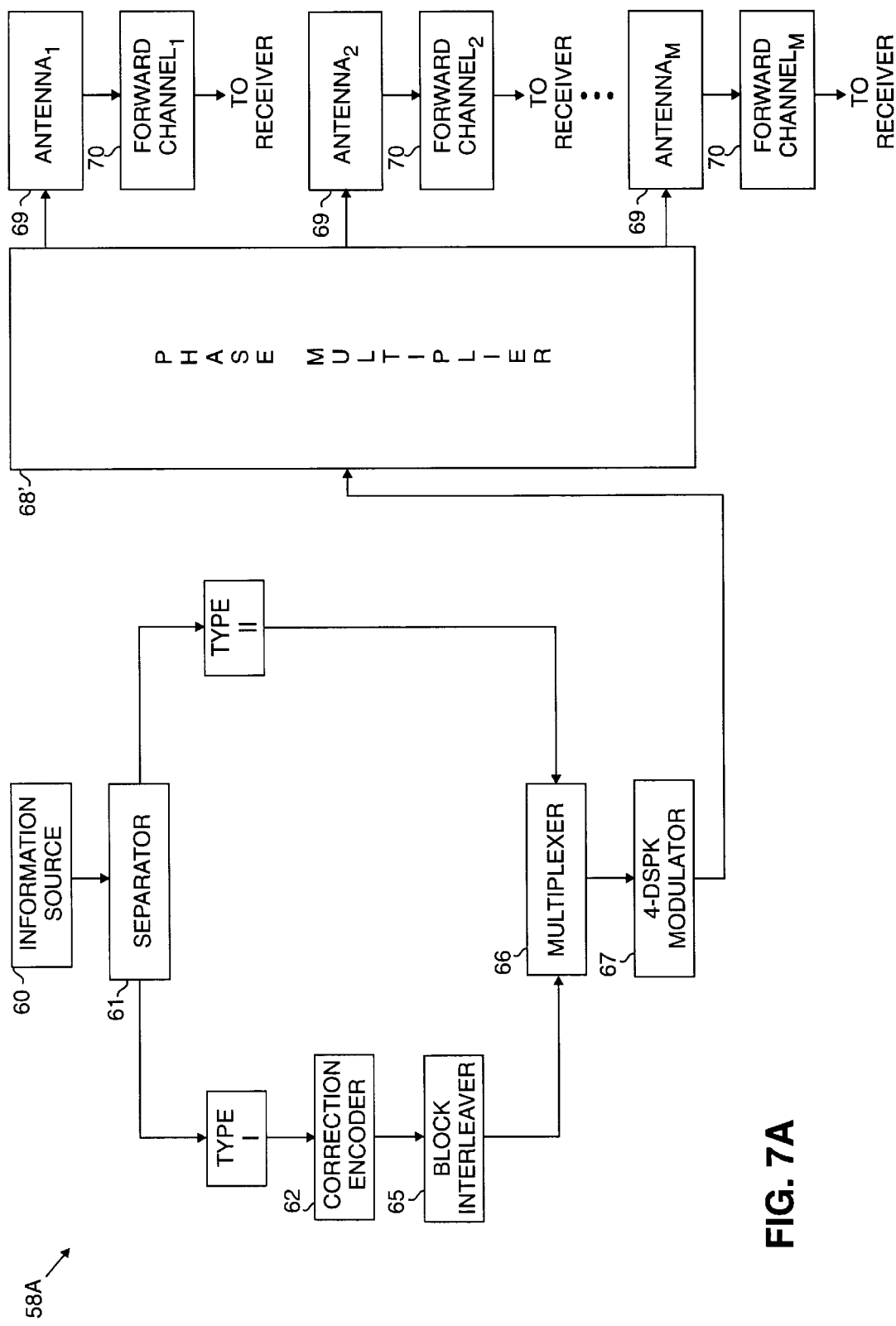
FIGS. 7A–7H show a third set of illustrative embodiments of the present invention for transmitting JPEG images with unequal error protection.
Figure 7B:
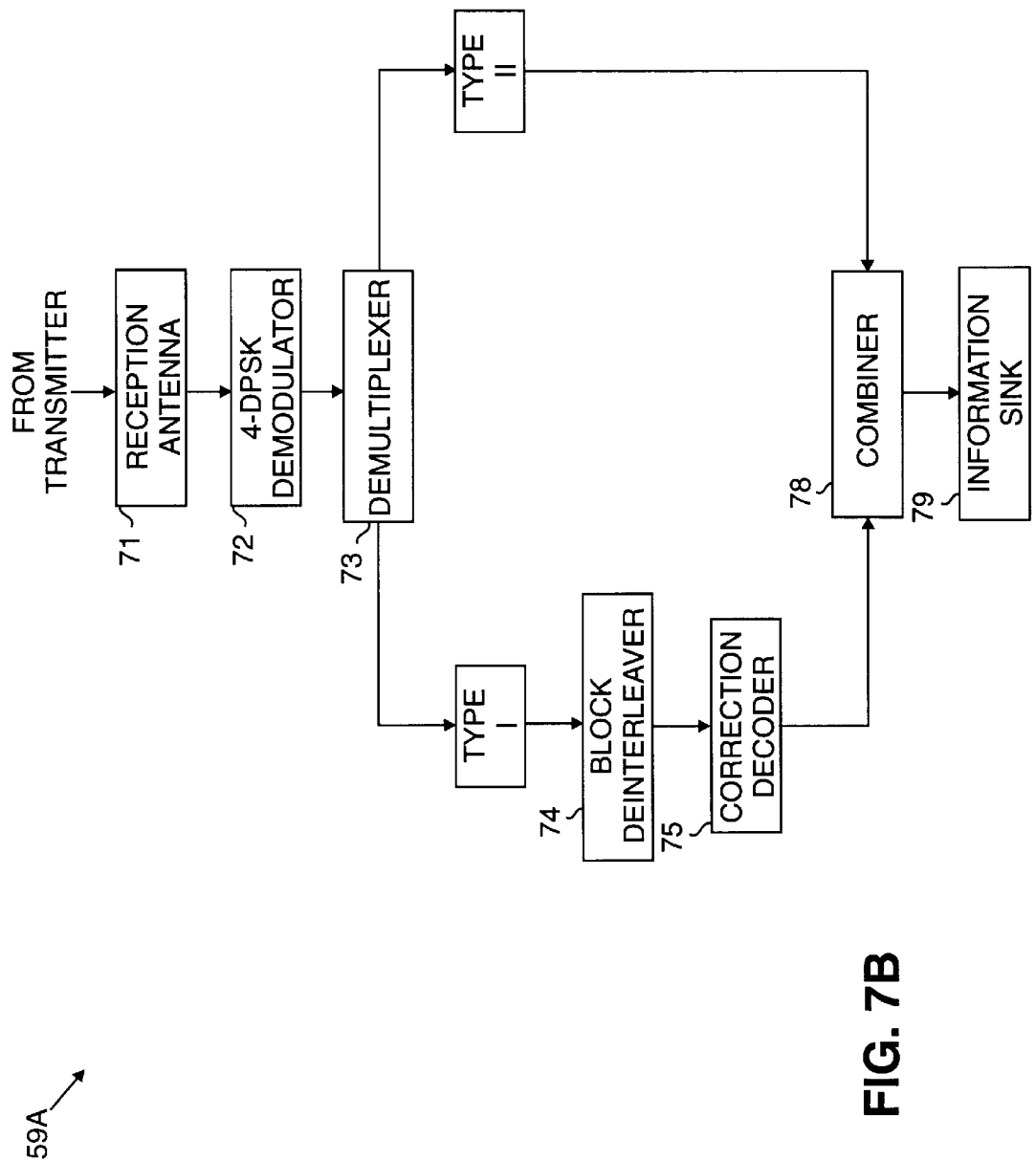

FIGS. 7A and 7B show one illustrative embodiment of the present invention used to transmit JPEG images with unequal error protection. There is no feedback channel in this illustrative embodiment for requesting re-transmission of information packets. This illustrative embodiment uses an unequal error protection FEC protocol, where the Type-I information packets are transmitted with more powerful error protection than the Type-II information packets.

FIG. 7A shows a transmitter 58A suitable for use with this embodiment and FIG. 7B shows a receiver 59A suitable for receiving and processing JPEG information packets transmitted using a forward error correction protocol.

The transmitter 58A in FIG. 7A includes, by way of example, a separator 61, an error correction encoder 62, a block interleaver 65, a multiplexer 66, a 4-DPSK modulator 67, phase multiplier 68', and a plurality of M antennas 69.

The receiver 59A shown in FIG. 7B includes, by way of example, one or more reception antennas 71, a 4-DPSK demodulator 72, demultiplexer 73, a block deinterleaver 74, an error correction decoder 75, and a combiner 78.

In this embodiment, by way of example, each Type-I packet is transmitted M times, giving rise to a 1/M repetition FEC code, where M is equal to the number antennas. The Type-II information packets are uncoded. Alternatively, the Type-II information packets may be coded with a less powerful FEC code.

A JPEG image is input from the information source 60 to the separator module 61 which separates the JPEG information into Type-I and Type-II information. The separator 61 may be, for example, a digital signal processor (DSP) with suitable software for separating the JPEG image into Type-I and Type-II information. As mentioned above, Type-I information is the most sensitive to transmission errors and Type-II information is the least sensitive.

The following is one example of how a DSP may be programmed to separate the Type-I information from the Type-II information for a single frame, single scan JPEG image. Other methods will be readily apparent to those of ordinary skill in the art for JPEG images having one or more frames 20 and one or more scans 23.

The DSP in this example examines the incoming bytes of the JPEG image for the hexadecimal byte ff, which denotes a marker. If an ff byte is detected, the DSP examines the next byte in the data stream, namely the marker code which describes the function of the marker. The purpose here is to determine whether the marker also includes a segment of parameters which will follow the marker in the data stream.

For example, if the next byte is hexadecimal d8, the DSP knows that the marker is a start of image marker which has no parameters, as shown in the table in FIG. 6B. In this case, the DSP separates the entire two-byte marker (ffd8) from the JPEG stream.

If, however, the next byte is hexadecimal db, the DSP knows that the marker is a define quantization table marker (ffdb) which has a variable length sequence of parameters following it in the data stream. As discussed above, markers with parameters following them are usually called marker segments.

In the case of a marker segment, the DSP examines the next two bytes in the data stream after the two-byte marker to determine the number of parameter bytes following the marker. The DSP then separates the two-byte marker and its parameter bytes from the JPEG data stream.

If a byte is not determined to be a marker or marker segment it is considered Type-II entropy coded information and sorted as such from the JPEG data stream.

In addition to separating the Type-I information from the Type-II information, the DSP also appends certain position information to the Type-I information so that the JPEG image structure can be recreated at the receiver. Various ways of doing this for one or more image frames 20, and one or more scans 23, will be readily apparent to those of ordinary skill in the art.

For example, as shown in FIG. 5, in a typical single frame, single scan JPEG image, all of the Type-I markers and marker segments occur before the Type-II entropy coded segments, with the exception of the Type-I restart markers and the end of image marker. Therefore, in a typical single frame, single scan JPEG image, only the positions of the end of image marker and restart markers need to be forwarded to the receiver.

One way the DSP can code the positions of the end of image marker and the restart markers is to keep a running count of the number of bytes in the JPEG data stream and use the byte number of the first restart marker (ffd0) as the starting position for the modulo 8 sequence of restart markers. For example, if the first restart marker (ffd0) is the 300th byte in the data stream, then its byte number is 300.

Once the byte number of the first restart marker is determined, the DSP can identify the relative byte positions of the remaining restart markers in the modulo 8 sequence (ffd1–ffd7).

Specifically, the DSP may assign a byte number to each subsequent restart marker which corresponds to the number of entropy coded bytes between it and the previous restart marker.

With respect to the end of image marker, the DSP may identify its position by its byte number in the data stream. If there are 400 bytes in the JPEG image, then the position of the end of image marker will be 400.

In an alternative embodiment, the positions of the restart markers are transmitted to the receiver without the restart markers themselves. This is because the restart markers occur in a known predetermined pattern (modulo 8 sequence: 0xffd0, 0xffd1, 0xffd2, 0xffd3, 0xffd4, 0xffd5, 0xffd6, and 0xffd7) which can be generated at the receiver.

Once the JPEG image is separated into Type-I and Type-II information packets, M copies of each Type-I information packet are formed by error correction encoder 62. In addition, the encoded Type-I information packets are interleaved by block interleaver 63, which provides some limited time diversity. The block interleaver 65 writes the bits of each encoded Type-I packet into an m×n memory matrix in a column-wise fashion and then reads them out row-wise. The interleaver randomizes the burst errors likely to occur on slow fading channels. If a burst error of length n occurs, the interleaver functions to effectively convert the burst error into single bit errors.

As mentioned above, the Type-II information packets are not coded for protection against errors in this example. Rather, the Type-II information packets are multiplexed with the encoded Type-I information packets by multiplexer 66 and modulated by 4-DPSK modulator 67 for transmission over forward channel 70 by the M antennas 69.

Figure 8A:
FIGS. 8A–8C show exemplary portions of the packet streams associated with the third set of illustrative embodiments.

FIG. 8A shows the multiplexed Type-I and Type-II information packets associated with a repetition code calling for M copies of each Type-I information packet. As shown in FIG. 8A, a fixed or variable number of Type-II information packets are transmitted between one or more Type-I information packets, providing some further time diversity for the Type-I information packets.

Prior to transmission, phase offsets are applied to the Type-I packets by phase multiplier 68'. Specifically, up to M sets of M fixed phase offsets may be applied to the M copies of each Type-I information packet, providing a rate 1/M repetition code with channel diversity order M, as illustrated by the packet stream of FIG. 8A. M slow varying phase offsets may be applied to the Type-II information packets. Alternatively, the Type-II packets may be transmitted with the same sets of M fixed phase offsets used to transmit the preceding Type-I information packets or with no phase offsets at all.

Reception antenna 71 of receiver 59A captures the phase offset Type-I and Type-II information packets transmitted by transmitter 58A. Once received, the Type-I and Type-II information packets are demodulated by the 4-DPSK demodulator 72 and de-multiplexed by demultiplexer 73 for processing along separate channels, although one of ordinary skill in the art will understand that other embodiments may use a single decoding channel.

The Type-I information packets are deinterleaved by deinterleaver 74 and stored in a buffer or other suitable memory device (not shown) for combining by the error correction decoder 75. Any suitable algorithm for combining the M copies of each Type-I information packet may be used.

As for the Type-II information packets in this embodiment, they are transmitted directly to combiner 78 to be combined with the Type-I information packets for the purpose of formatting the Type-I and Type-II information packets with a JPEG structure suitable for data sink 79.

In more detail, the combiner 78 combines the Type-I and Type-II information packets into a structure suitable for the information sink 79, which normally will be the original JPEG structure. The combiner 78 may be a digital signal processor (DSP) which is programmed to combine the Type-I and Type-II information.

For example, the DSP may be programmed to place the first restart marker and the end of image marker at their respective byte number positions in the data stream. Each of the other restart markers is placed at a byte position relative to the preceding restart marker. As discussed above, the relative position of each restart marker was coded by separator 61 as the number of Type-II information bytes after the preceding restart marker. Finally, if only the positions of the restart markers are sent, the DSP may also be further programmed to generate the modulo 8 sequence of restart markers at the coded relative byte number positions.

Figure 7C:
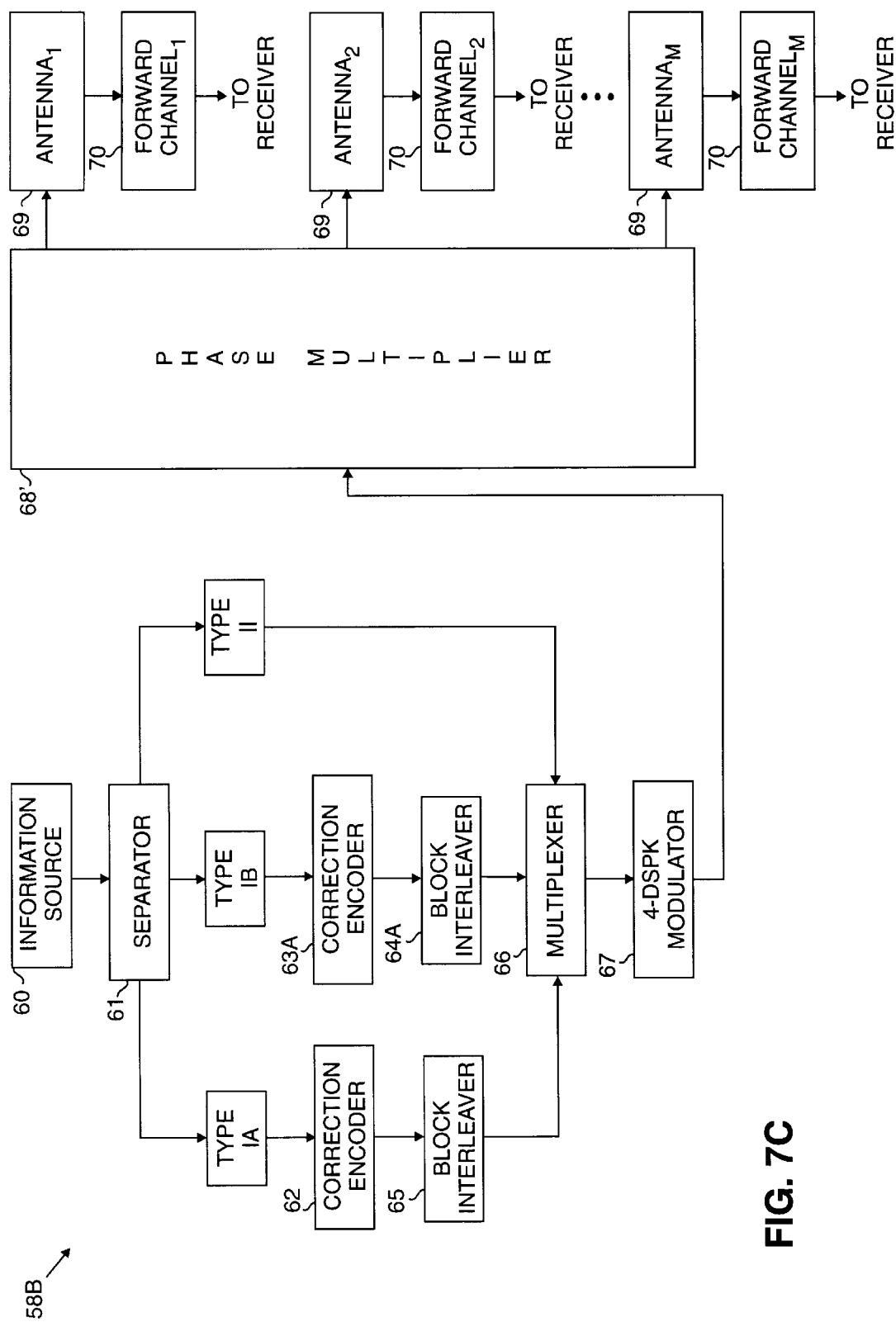
Figure 7D:
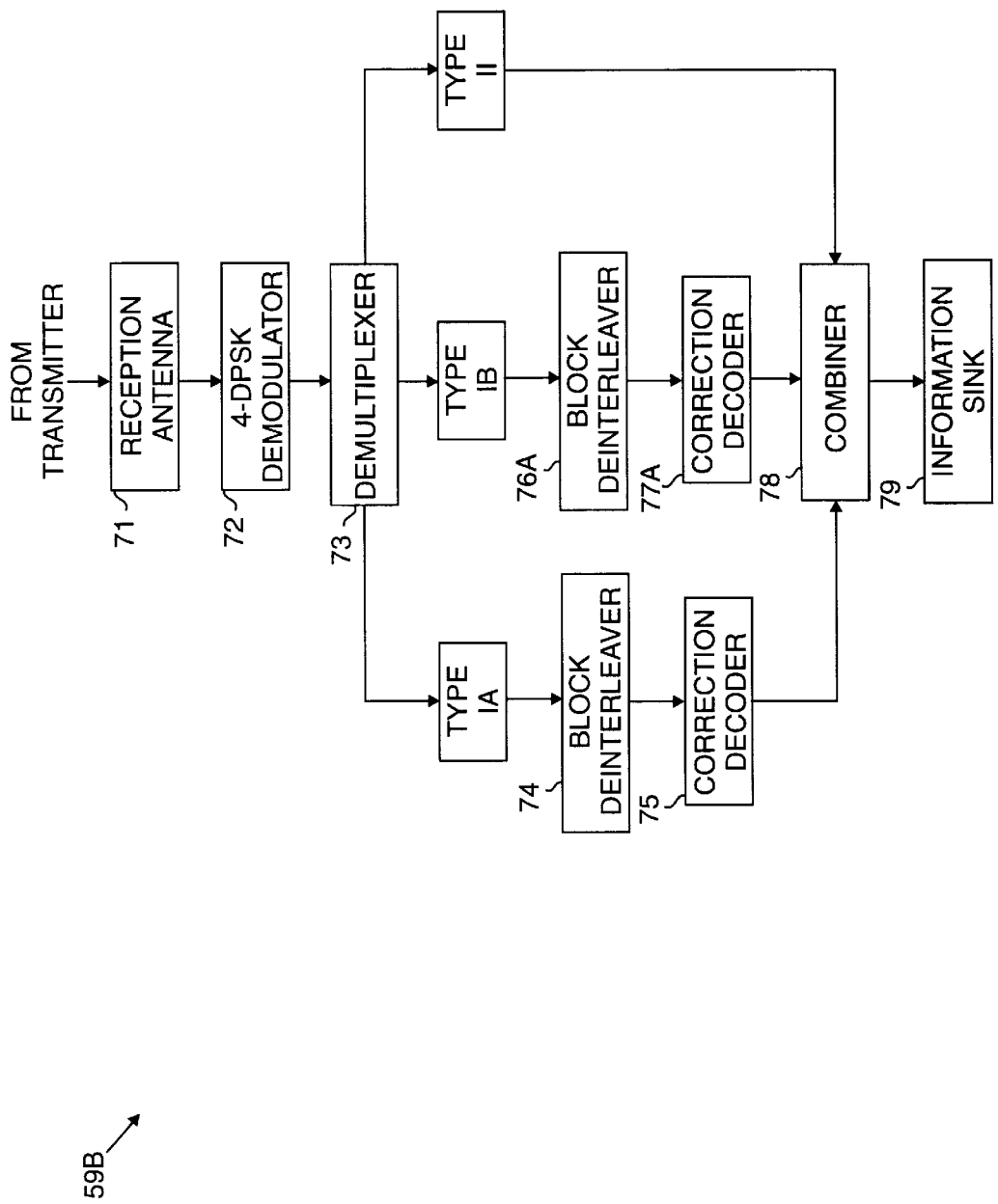

A still further illustrative embodiment of the present invention without an ARQ feedback channel is shown in FIGS. 7C and 7D. A transmitter 58B is shown in FIG. 7C and a receiver 59B is shown in FIG. 7D. This embodiment is a modification of the transmitter 58A and receiver 59A shown in FIGS. 7A and 7B, respectively.

As shown in FIGS. 7C and 7D, this embodiment further separates the Type-I information into Type-IA and Type-IB information and includes an additional encoding channel in the transmitter and decoding channel in the receiver for the Type-IB information. Specifically, transmitter 58B in FIG. 7C includes an error correction encoder 63A and block interleaver 64A for the Type-IB information. The receiver 59B, in turn, includes a complementary block deinterleaver 76A and error correction decoder 77A. By way of example only, the Type-IB information packets may be encoded with a less powerful rate 1/N repetition code where N<M.

Figure 7E:
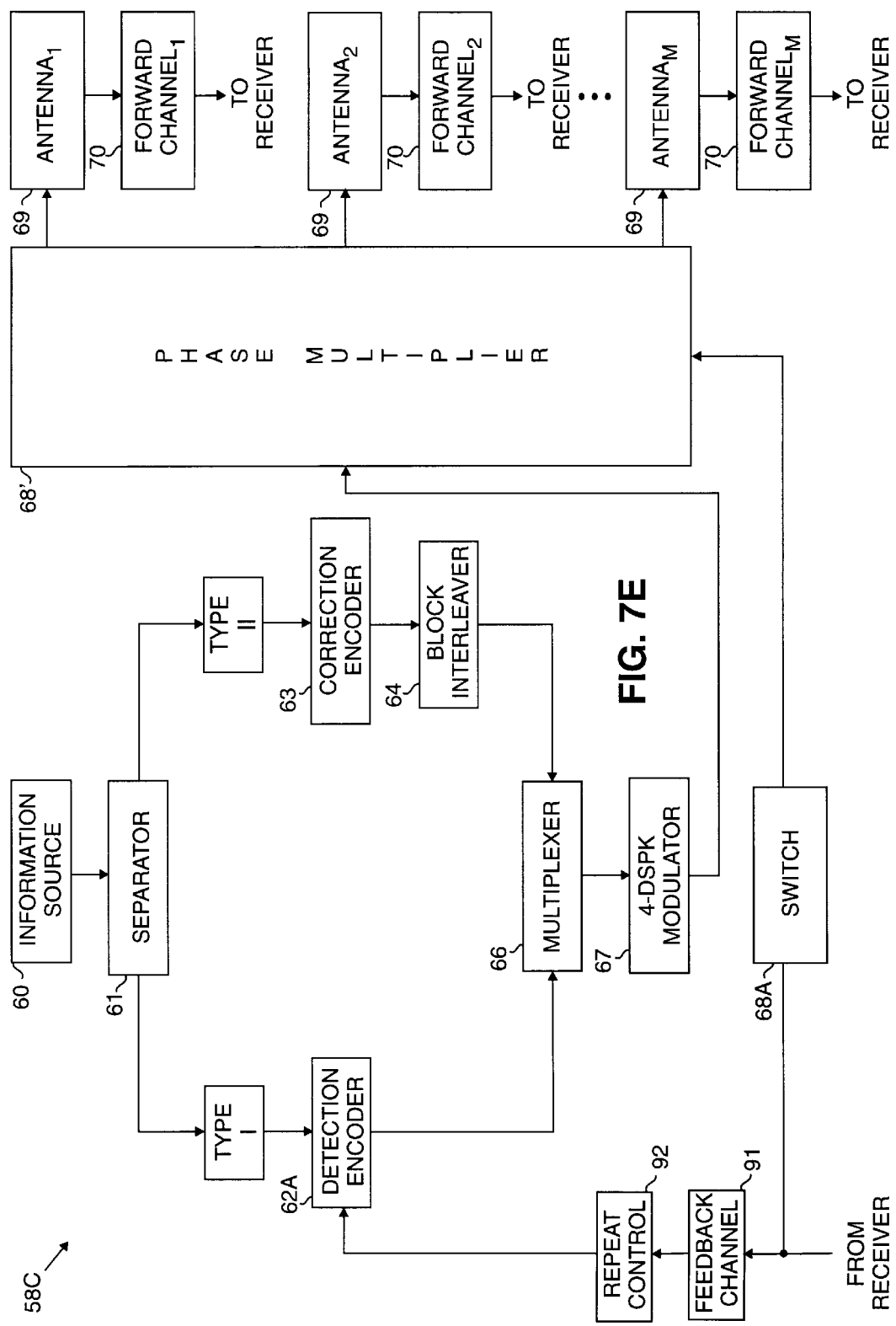
Figure 7F:
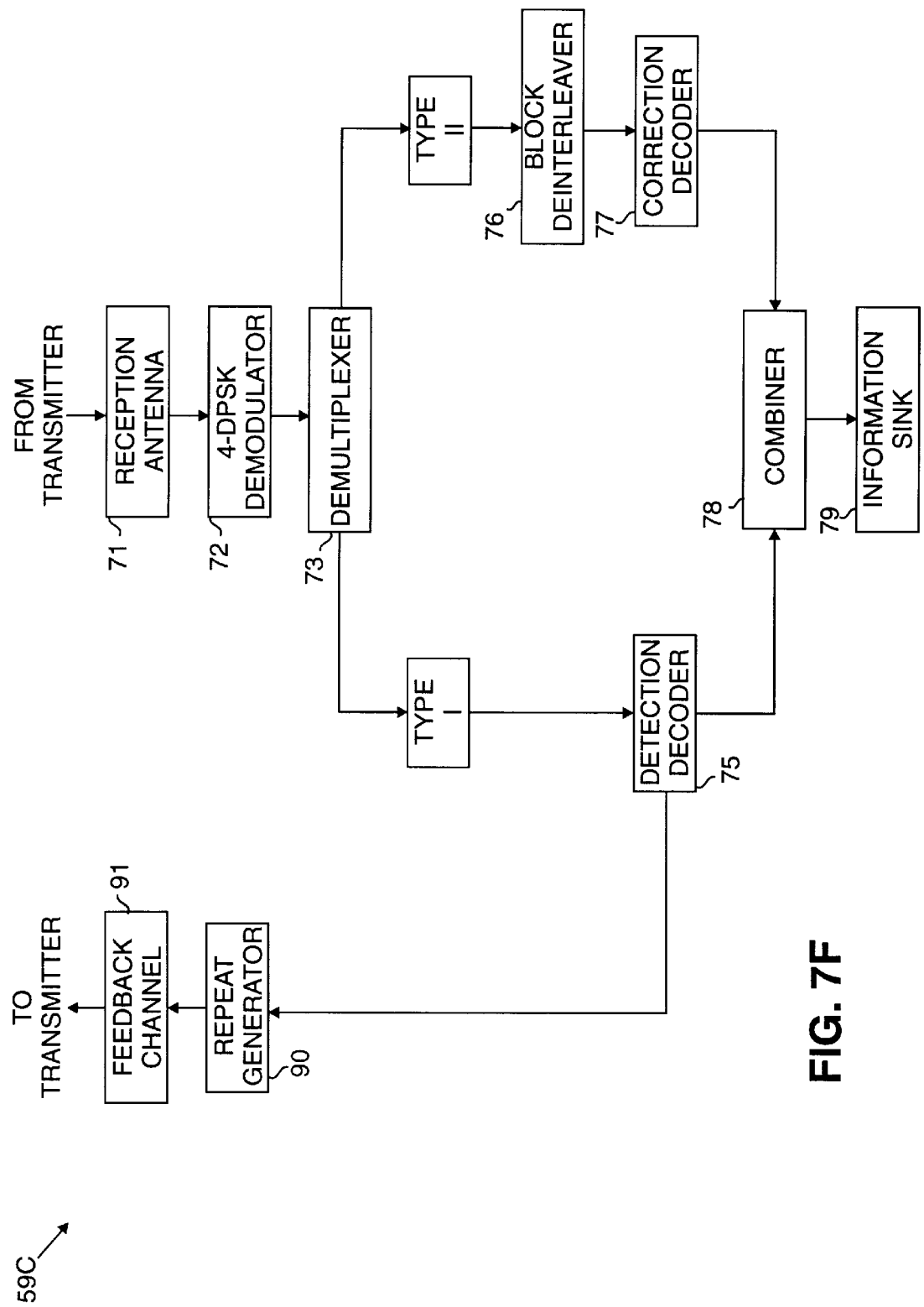

In further illustrative embodiments of the present invention, the relatively error-free ARQ and hybrid ARQ error protection embodiments of the present invention (FIGS. 3A–3F) may be used to transmit JPEG images with unequal error protection. One such illustrative embodiment is shown in FIGS. 7E and 7F. FIG. 7E shows a transmitter 58C and FIG. 7F shows a receiver 59C.

The transmitter 58C of FIG. 7E comprises, by way of example, a separator 61, a detection encoder 62A, an error correction encoder 63, a block interleaver 64, a multiplexer 66, a 4-DPSK modulator 67, a phase multiplier 68', a switch 68A, a plurality of M antennas, and a repeat generator 90.

The receiver 59C of FIG. 7F comprises, by way of example, one or more reception antennas 71, a 4-DPSK demodulator 72, a demultiplexer 73, an error detection decoder 75, a block deinterleaver 76, an error correction decoder 77, a combiner 78, and a repeat generator 90.

Turning to FIG. 7E, the JPEG image is input from information source 60 and separated into Type-I and Type-II information packets, as explained above.

The Type-I packets are encoded by error detection encoder 62A with an error detection code and the Type-II information packets are encoded by error correction encoder 63 with an error correction code. The error detection code is preferable a CRC-16 code and the error correction code may be any suitable forward error correction code. FEC protocols provide less powerful error protection than ARQ and hybrid ARQ protocols.

Multiplexer 66 multiplexes the encoded Type-II information packets in the time slots left idle between transmissions of the Type-I packets during which the transmitter waits for an acknowledgement from the transmitter. Once the packets are multiplexed, the 4-DPSK modulator 67 modulates them for transmission by the N antennas 69 over forward channel 70 to receiver 59C.

The present invention reduces the effects of multipath fading by applying phase offsets to the Type-I and Type-II information packets using phase multiplier 68'. The Type-I packets are transmitted with a first set of M fixed phase offsets. As for the Type-II packets, they may be transmitted with the same first set of M fixed phase offsets applied to the Type-I information packets. Alternatively, no phase offsets or M time varying phase offsets may be applied to the Type-II information packets.

Turning to the receiver 59C in FIG. 7F, the phase offset Type-I information packets are received by reception antenna 71, demodulated by demodulator 72, and demultiplexed by demultiplexer 73 for processing along separate channels, although a single channel may be used instead.

The Type-II information packets are deinterleaved and decoded by block deinterleaver 76 and error correction decoder 77, respectively, and then stored in a suitable memory device in combiner 78 for combining with the Type-I information packets in a JPEG format.

Figure 8B:

Each Type-I information packet is checked for errors by error detection decoder 75. If no errors are found, a positive acknowledgement is sent by repeat generator 90 over feedback channel 91 to transmitter 58C. In response, the repeat controller 92 of transmitter 58C sends the next Type-I information packet with the same set of M fixed phase offsets, as shown in the packet stream of FIG. 8B.

Figure 8C:

If errors are detected in a Type-I information packets, the repeat generator 90 sends a negative acknowledgement over feedback channel 91 to transmitter 58C. As shown in FIG. 7E, in response to the negative acknowledgement, repeat controller 92 and switch 68A retransmit the erroneous packet from transmitter 58C with a second set of M fixed phase offsets, as shown by the packet stream of FIG. 8C.

Figure 7G:
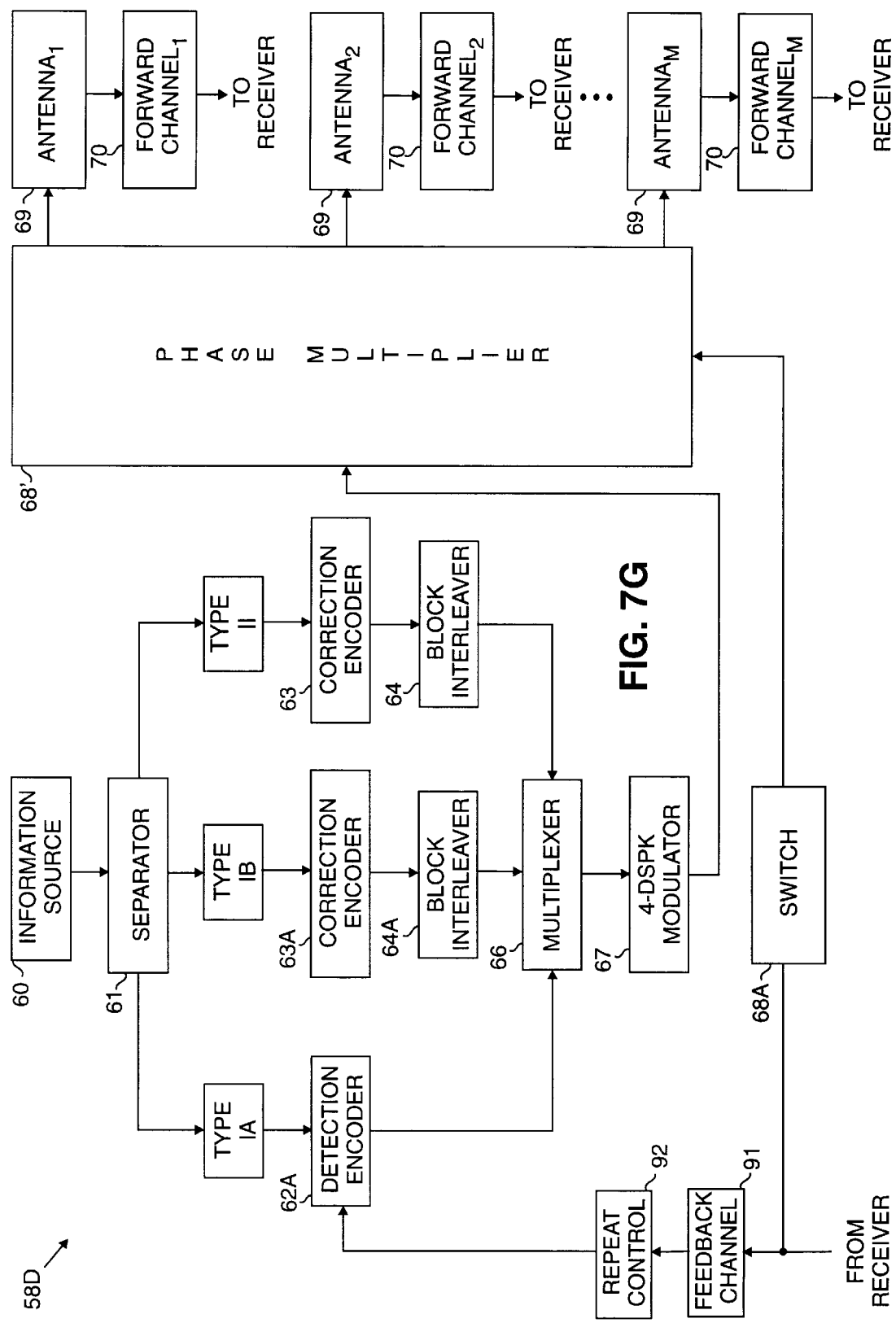
Figure 7H:
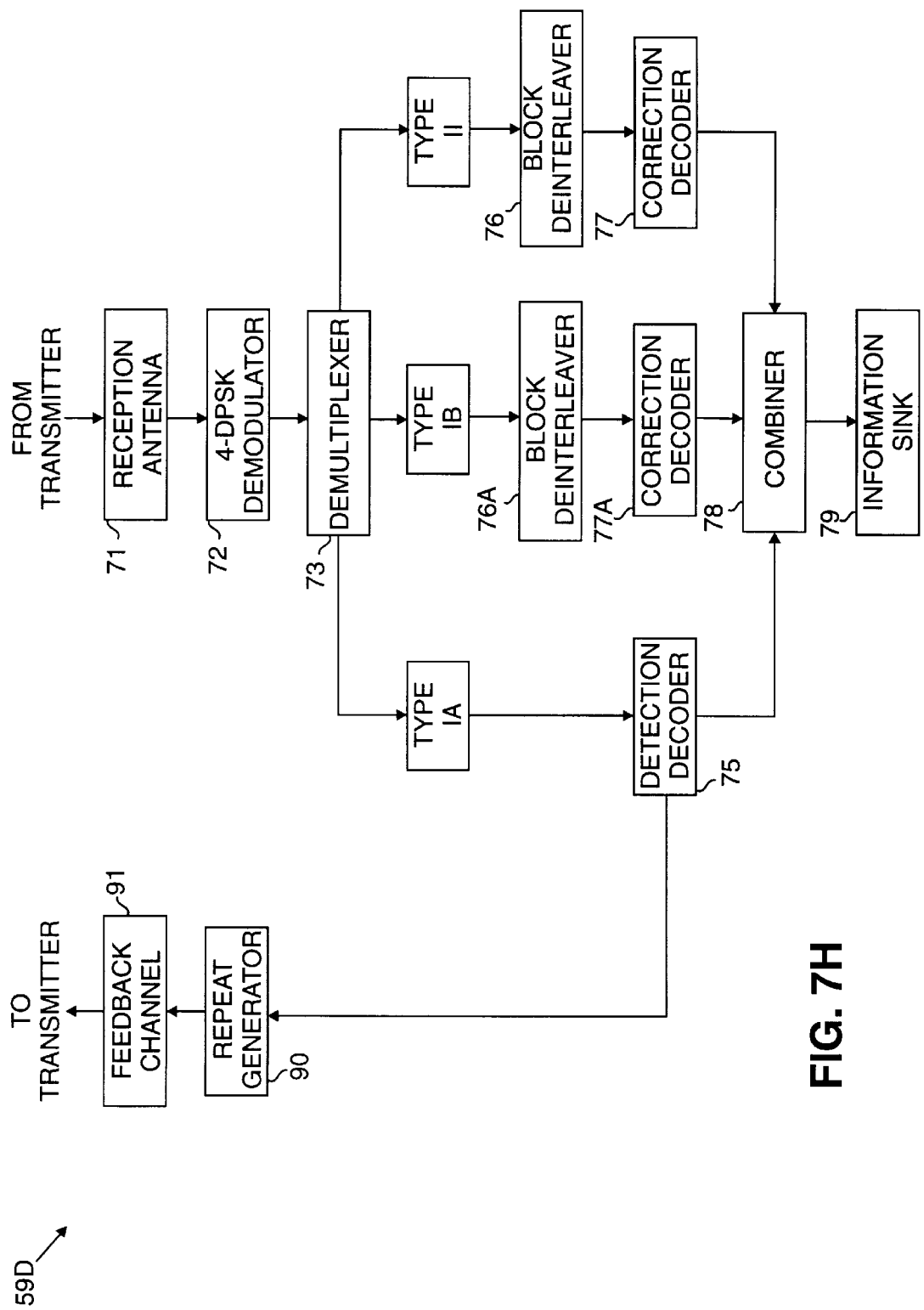

A further illustrative ARQ embodiment of the present invention is shown in FIGS. 7G and 7H for transmitting Type-IA, Type-IB, and Type-II information of a JPEG image.

This embodiment is a modification of the embodiment shown in FIGS. 7E and 7F. FIG. 7G shows a transmitter 58D and FIG. 7H shows a receiver 59D. The transmitter 58C of FIG. 7E has been modified to include an additional encoding channel for the Type-IB information packets comprised of an error correction encoder 63A and a block deinterleaver 64A. And the receiver 59C of FIG. 7F has been modified to include an additional, complementary decoding channel for the encoded Type-IB packets comprised of block deinterleaver 76A and error correction decoder 77A.

The Type-IA information packets are transmitted with an error detection code for use with the ARQ feedback channel discussed above. The Type-IB information packets may be encoded by error correction encoder 64A with any suitable FEC code. And the Type-II information packets may be encoded by error correction encoder 64 with the same or a less powerful FEC code than the Type-IB information packets.

Various changes and modifications of the present invention will be readily apparent to those of ordinary skill in the art, and all such changes and modifications are considered to fall within the scope of the invention as defined by the appended claims. In particular, the present invention may also be used with fast-fading channels.

We claim:

1. A transmitter for transmitting information packets over a wireless communication medium to a receiver, comprising:
   a modulator for modulating the information packets;
   groups of information packets over the wireless communication medium to the receiver.

2. The transmitter of claim 1, wherein the modulator is a 4DPSK modulator.

3. The transmitter of claim 1, wherein the multiplier is a plurality of M multipliers.

4. The transmitter of claim 1, further comprising an error correction encoder for encoding the information packets with a forward error correction code.

5. The transmitter of claim 4, wherein the forward error correction code is block code.

6. The transmitter of claim 4, wherein the forward error correction code is a convolutional code.

7. A transmitter for transmitting information packets over a wireless communication medium to a receiver, comprising:
   a modulator for modulating first and second groups of information packets;
   a multiplier for applying up to M sets of M fixed phase offsets to the first group of modulated information packets and for applying M slow time varying phase offsets to the second group of modulated information packets, wherein each modulated information packet in the first group is transmitted simultaneously from M antennas with a set of M fixed phase offsets, wherein each set of the M sets of M fixed phase offsets provides substantially independent fading characteristics for the transmission of a modulated information packet; and
   a plurality of M antennas for transmitting the phase offset, modulated first and second groups of information packets over the wireless communication medium to the receiver.

8. The transmitter of claim 7, further comprising a multiplexer for multiplexing the second group of information packets with the information packets of the first group.

9. A transmitter for transmitting information packets over a wireless communication medium to a receiver, comprising:
   an error detection encoder for encoding the information packets with an error detection code;
   a modulator for modulating the error detection encoded information packets;
   a multiplier for applying first and second sets of M fixed phase offsets to the modulated information packets for transmission of each modulated information packet simultaneously from M antennas with a set of M fixed phase offsets, wherein said second set of M fixed phase offsets is applied to the modulated information packets in response to a negative acknowledgement from the receiver, wherein the first and second sets of M fixed phase offsets each provide substantially independent fading characteristics; and
   a plurality of M antennas for transmitting the phase offset, modulated information packets over the wireless communication medium.

10. The transmitter of claim 9, further comprising a switch for applying the second set of M fixed phase offsets in response to the negative acknowledgement.

11. A transmitter for transmitting information packets over a wireless communication medium to a receiver, comprising:
   an error detection encoder for encoding a first group of information packets with an error detection code for detecting errors in the information packets transmitted to the receiver;
   a modulator for modulating the error detection encoded first group of information packets and a second group of information packets;
   a first multiplier for applying first and second sets of M fixed phase offsets to the first group of modulated information packets for transmission of each modulated information packet in the first group simultaneously from M antennas with a set of M fixed phase offsets, wherein said second set of M fixed phase offsets is applied to the first group of information packets in response to a negative acknowledgement from the receiver, wherein the first and second sets of M fixed phase offsets each provide substantially independent fading characteristics; and
   a plurality of M antennas for transmitting the phase offset, modulated first group of information packets and the modulated second group of information packets over the wireless communication medium to the receiver.

12. The transmitter of claim 11, further comprising a multiplexer for multiplexing the second group of information packets with the error detection encoded first group of information packets.

13. The transmitter of claim 11, further comprising a second multiplier for applying M slow time varying phase offsets to the second group of modulated information packets.

14. A method of transmitting information packets over a wireless communication medium to a receiver, comprising:
   modulating the information packets;
   applying up to M sets of M fixed phase offsets to the modulated information packets for transmission of each modulated information packet simultaneously from M antennas with a set of M fixed phase offsets, wherein each of the M sets of M fixed phase offsets provides substantially independent fading characteristics; and
   transmitting the phase offset, modulated information packets from a plurality of M antennas over the wireless communication medium to the receiver.

15. A method of transmitting information packets over a wireless communication medium to a receiver, comprising:
   modulating first and second groups of information packets;
   applying up to M sets of M fixed phase offsets to the first and second group of modulated information packets wherein each modulated information packet in the first group is transmitted simultaneously from M antennas with a set of M fixed phase offsets, wherein each of the M sets of M fixed phase offsets provides substantially independent fading characteristics; and applying M slow time varying phase offsets to the second group of modulated information packets; and transmitting the phase offset, modulated first and second groups of information packets from a plurality of M antennas over the wireless communication medium to the receiver.

16. A method of transmitting information packets over a wireless communication medium to a receiver, comprising:

encoding the information packets with an error detection code for detecting errors in the information packets transmitted to the receiver;

modulating the error detection encoded information packets;

applying first and second sets of M fixed phase offsets to the modulated information packets for transmission of each modulated information packet simultaneously from M antennas with a set of M fixed phase offsets, wherein said second set of phase offsets is applied to the modulated information packets in response to a negative acknowledgement, wherein the first and second sets of M fixed phase offsets each provide substantially independent fading characteristics; and transmitting the phase offset, modulated information packets from a plurality of M antennas over the wireless communication medium to the receiver.

17. A method of transmitting information packets over a wireless communication medium to a receiver, comprising:

encoding a first group of information packets with an error detection code for detecting errors in the information packets transmitted to the receiver;

modulating the error detection encoded first group of information packets;

modulating a second group of information packets;

applying first and second sets of M fixed phase offsets to the first group of modulated information packets for transmission of each modulated information packet in the first group simultaneously from M antennas with a set of M fixed phase offsets, wherein said second set of phase offsets is applied to the first group of modulated information packets in response to a negative acknowledgement, wherein the first and second sets of M fixed phase offsets each provide substantially independent fading characteristics; and transmitting the phase offset, modulated first group of information packets and the modulated second group of information packets from a plurality of M antennas over the wireless communication medium to the receiver.

* * * * *